United States Patent
Labrozzi et al.

(10) Patent No.: US 9,001,886 B2
(45) Date of Patent: Apr. 7, 2015

(54) DYNAMIC TIME SYNCHRONIZATION

(75) Inventors: Scott C. Labrozzi, Cary, NC (US);
Mark D. McBride, Cary, NC (US);
Kevin Scott Kirkup, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 650 days.

(21) Appl. No.: 13/301,348

(22) Filed: Nov. 21, 2011

(65) Prior Publication Data

US 2012/0128061 A1    May 24, 2012

Related U.S. Application Data

(60) Provisional application No. 61/415,961, filed on Nov. 22, 2010.

(51) Int. Cl.
*H04N 7/12* (2006.01)
*H04N 21/242* (2011.01)
*H04N 21/2343* (2011.01)

(52) U.S. Cl.
CPC ..... *H04N 21/242* (2013.01); *H04N 21/234354* (2013.01); *H04N 21/23439* (2013.01)

(58) Field of Classification Search
None
See application file for complete search history.

(56) References Cited

U.S. PATENT DOCUMENTS

| | | | |
|---|---|---|---|
| 5,553,061 A | 9/1996 | Waggener et al. | |
| 5,995,159 A | 11/1999 | Bae et al. | |
| 6,011,589 A * | 1/2000 | Matsuura et al. | 375/240.14 |
| 6,016,162 A * | 1/2000 | Odaka et al. | 375/240.04 |
| 6,097,442 A | 8/2000 | Rumreich et al. | |
| 6,167,030 A | 12/2000 | Kilkki et al. | |
| 6,204,883 B1 | 3/2001 | Tsukagoshi | |
| 6,345,307 B1 | 2/2002 | Booth | |
| 6,493,386 B1 | 12/2002 | Vetro et al. | |
| 6,542,546 B1 | 4/2003 | Vetro et al. | |
| 6,804,198 B1 | 10/2004 | Iwamoto | |
| 7,245,586 B2 | 7/2007 | Bitar et al. | |

(Continued)

FOREIGN PATENT DOCUMENTS

| | | |
|---|---|---|
| EP | 1622385 | 2/2006 |
| WO | WO2006/004472 | 1/2006 |

(Continued)

OTHER PUBLICATIONS

Adobe Systems Incorporated, "Flexible delivery of on-demand and live video streaming," © 2011, 3 pages, http://www.adobe.com/products/httpdynamicstreaming/.

(Continued)

*Primary Examiner* — Joseph Ustaris
*Assistant Examiner* — Zhubing Ren
(74) *Attorney, Agent, or Firm* — Patent Capital Group

(57) ABSTRACT

A method is provided in certain example embodiments and may include evaluating a first video stream being encoded by a first encoding element, where the first video stream is provided at a first bit rate. The method may also include evaluating a second video stream being encoded by a second encoding element, where the second video stream is provided at a second bit rate. The method may further include providing an output that is reflective of a time synchronization and a frame alignment for a plurality of frames within the first video stream and the second video stream.

17 Claims, 23 Drawing Sheets

(56) References Cited

U.S. PATENT DOCUMENTS

| | | | |
|---|---|---|---|
| 7,961,607 B2 | 6/2011 | De Cnodder et al. | |
| 8,301,982 B2 | 10/2012 | Ver Steeg et al. | |
| 8,683,013 B2 | 3/2014 | Major et al. | |
| 2001/0047517 A1 | 11/2001 | Christopoulos et al. | |
| 2002/0006165 A1 | 1/2002 | Kato | |
| 2002/0049983 A1* | 4/2002 | Bove et al. | 725/135 |
| 2002/0122136 A1 | 9/2002 | Safadi et al. | |
| 2003/0030752 A1 | 2/2003 | Begeja et al. | |
| 2003/0035063 A1 | 2/2003 | Orr | |
| 2003/0236904 A1 | 12/2003 | Walpole | |
| 2005/0055712 A1 | 3/2005 | Whyte et al. | |
| 2007/0008986 A1 | 1/2007 | Xie et al. | |
| 2007/0022185 A1 | 1/2007 | Hamilton et al. | |
| 2007/0033623 A1 | 2/2007 | Fredrickson et al. | |
| 2007/0280232 A1 | 12/2007 | Dec et al. | |
| 2008/0263219 A1 | 10/2008 | Bacchi et al. | |
| 2010/0254455 A1* | 10/2010 | Matsunaga | 375/240.12 |
| 2011/0072148 A1 | 3/2011 | Begen et al. | |
| 2011/0082924 A1 | 4/2011 | Gopalakrishnan | |
| 2011/0138020 A1 | 6/2011 | Pantos et al. | |
| 2011/0164673 A1 | 7/2011 | Shaffer | |
| 2011/0289538 A1 | 11/2011 | Begen et al. | |
| 2012/0128061 A1 | 5/2012 | Labrozzi et al. | |
| 2012/0163718 A1 | 6/2012 | Reddy | |
| 2012/0176540 A1 | 7/2012 | Labrozzi et al. | |
| 2012/0254456 A1 | 10/2012 | Visharam et al. | |

FOREIGN PATENT DOCUMENTS

| | | |
|---|---|---|
| WO | WO2011/015243 | 2/2011 |
| WO | WO2012/145108 | 10/2012 |
| WO | WO2013/116554 | 8/2013 |

OTHER PUBLICATIONS

Cisco Press Release, "Cisco and Service Providers Aim to Reinvent the TV Experience with Videoscape," Cisco Systems, Jan. 5, 2011, Las Vegas, NV http://newsroom.cisco.com/press-release-content?type=webcontent&articleId=5856789. d Cisco Systems, "Videoscape Unity: The Future of Television," 2 pages [Retrieved and printed Oct. 2, 2013] http://www.cisco.com/en/US/netsol/ns1043/networking_solutions_market_segment_solution.html.

Ibanez, J., et al., "Preliminary Simulation Evaluation of an Assured Service," IETF Internet Draft, <draft-ibanez-diffserv-assured-eval-oo.txt>, Aug. 1998, 20 pages http://tools.ietf.org/html/draft-ibanez-diffserv-assured-eval-00.

ISO/IEC 13818-1 International Standard, "Information Technology—Generic Coding of Moving Pictures and Associated Audio Information: Systems," Dec. 1, 2000, ©ISO/IEC 2000; printed in Switzerland; 174 pages.

MPEG Transport Stream from Wikipedia, the free encyclopedia; 7 pages, Sep. 6, 2012 http://enwikipedia.org/wiki/MPEG_transport_stream.

MPEG-2 from Wikipedia, the free encyclopedia; 32 pages; Sep. 6, 2012 http://en.wikipedia.org/wiki/MPEG-2.

Neglia, Giovanni, et al., "An Analytical Model of a new Packet Marking Algorithm for TCP Flows," Elsevier Science, Sep. 12, 2005, 28 pages http://www-sop.inria.fr/members/Giovanni.Neglia/publications/neglia06comnet.pdf.

Pantos, R., "HTTP Live Streaming," Informational Internet Draft, Nov. 19, 2010, 23 pages, http://tools.ietf.org/html/draft-pantos-http-live-streaming-05.

USPTO Jul. 29, 2014 Non-Final Office Action from U.S. Appl. No. 13/346,541.

USPTO Nov. 26, 2014 Final Rejection from U.S. Appl. No. 13/346,541.

* cited by examiner

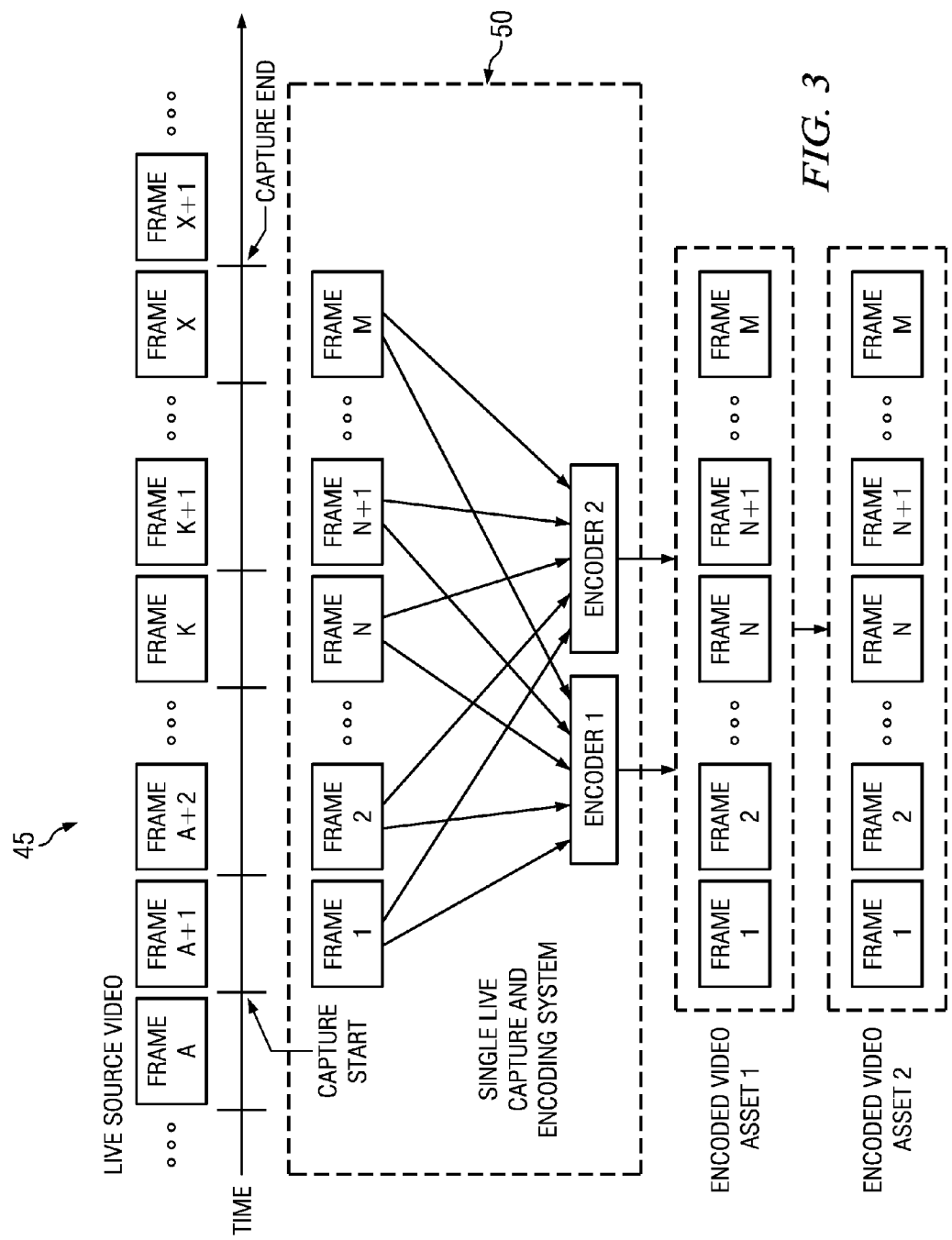

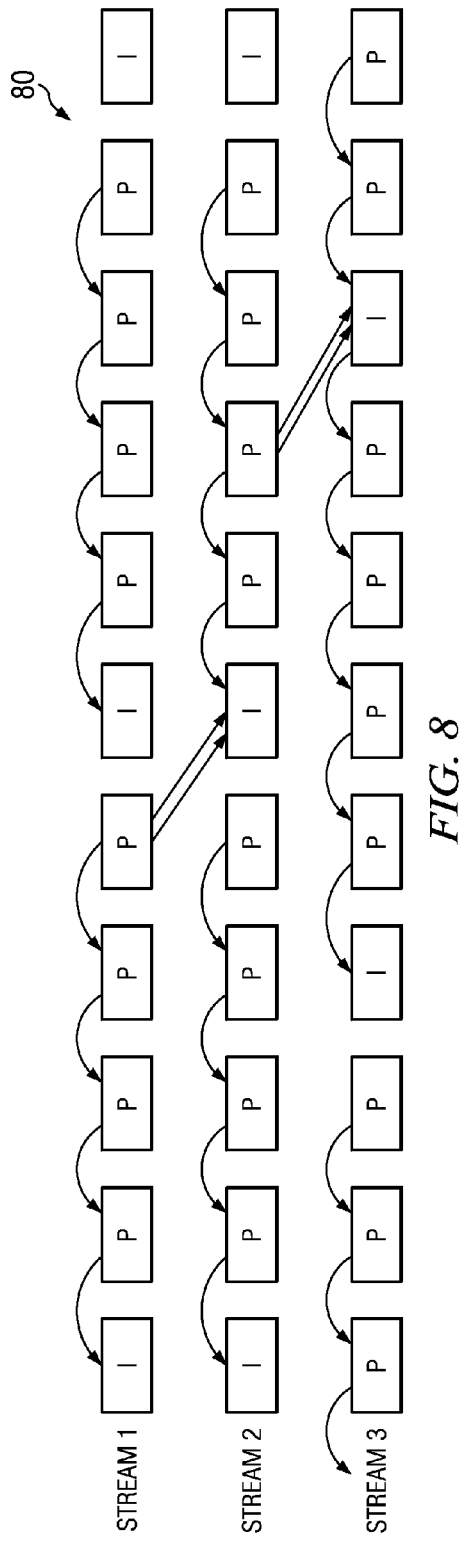
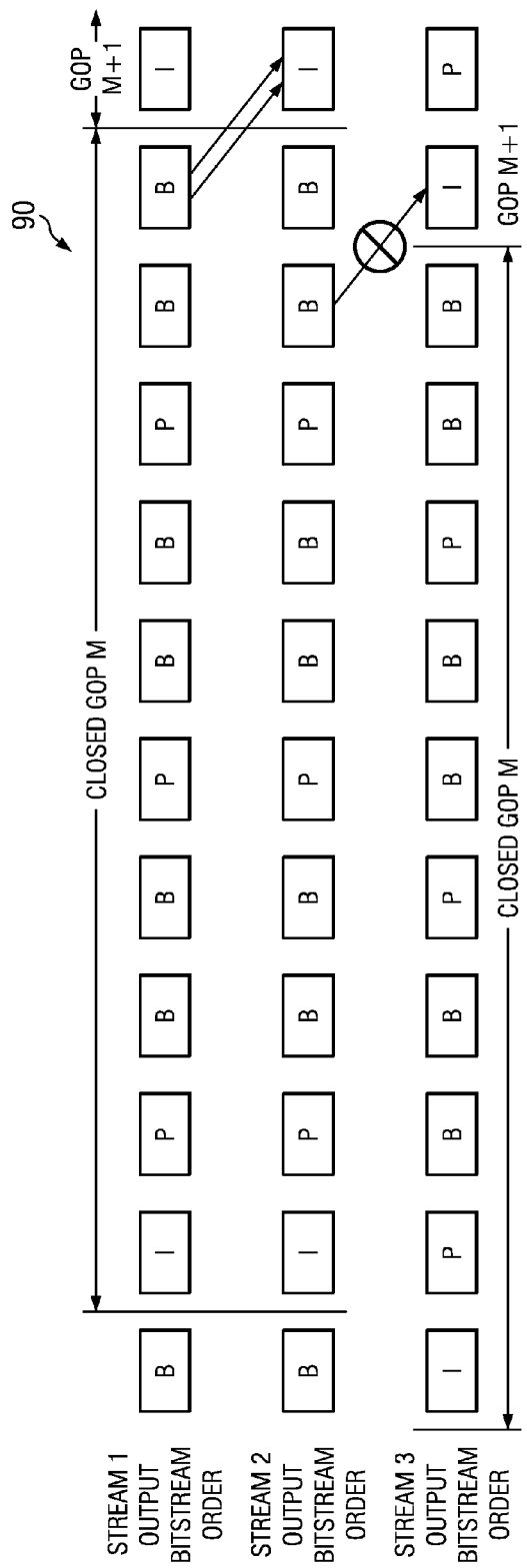
FIG. 8
FIG. 9

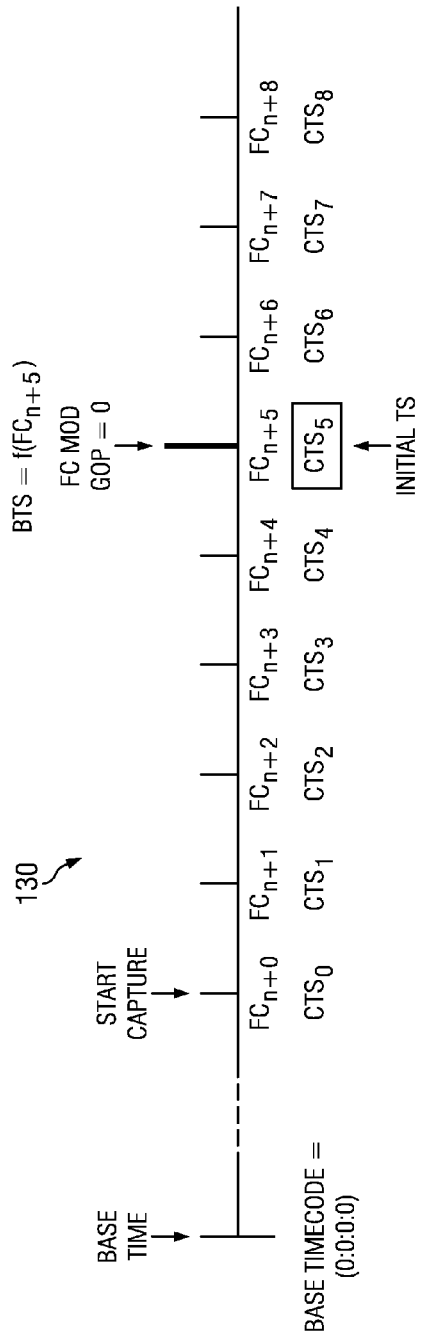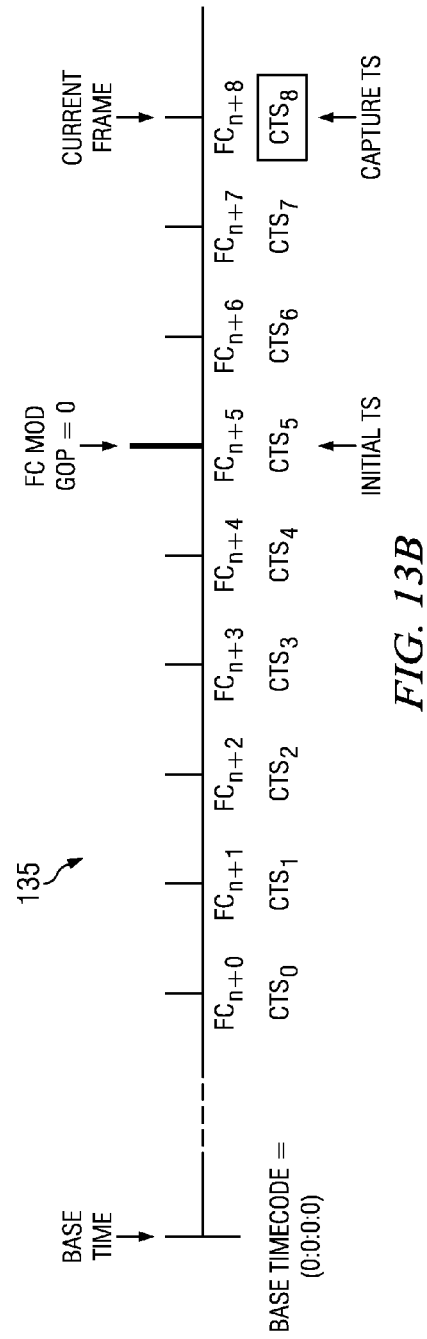

DYNAMIC TIME SYNCHRONIZATION

CROSS-REFERENCE TO RELATED APPLICATIONS

This Application claims the benefit of priority under 35 U.S.C. §119(e) to U.S. Provisional Patent Application Ser. No. 61/415,961 filed on Nov. 22, 2010 and entitled "Dynamic Time Synchronization," which is hereby incorporated by reference in its entirety.

TECHNICAL FIELD

The present disclosure relates to video communications and, more particularly, to dynamic time synchronization.

BACKGROUND

The speed of consumer broadband Internet access can vary. In many instances, quoted download speeds are maximum rates that are not guaranteed. Furthermore, download speeds are generally not guaranteed to be sustainable for a certain duration of time. The delivery of quality video assets over a data communication network, such as the Internet, is hindered by: 1) the wide variation in consumer broadband Internet access speeds; 2) the capabilities of end user devices; and 3) the axiom that the advertised download rates are not guaranteed to be sustainable at a consistent or known rate. These limitations have forced producers of online video content to produce a given video asset at a number of data rates (also referred to as bit rates or encoding rates) that can be offered as alternatives to consumers. Hence, providing quality video transmissions in a network environment presents a significant challenge to component manufacturers, system architects, and service providers, alike.

BRIEF DESCRIPTION OF THE DRAWINGS

FIG. 3 is a simplified block diagram illustrating a capture and encoding system including a single capture subsystem and multiple encoders;

FIG. 8 is a simplified schematic that illustrates aligned and unaligned switching for video streams including I-frames and P-frames;

FIG. 9 is a simplified schematic that illustrates aligned switching for video streams including I-frames, P-frames, and B-frames;

FIGS. 13A and 13B are timing diagrams that illustrate example embodiments of generating synchronous timestamps;

DETAILED DESCRIPTION OF EXAMPLE EMBODIMENTS

Overview

A method is provided in certain example embodiments, and may include evaluating a first video stream being encoded by a first encoding element, where the first video stream is provided at a first bit rate. The method may also include evaluating a second video stream being encoded by a second encoding element, where the second video stream is provided at a second bit rate. The method may further include providing an output that is reflective of a time synchronization and a frame alignment for a plurality of frames within the first video stream and the second video stream.

In specific implementations, the frame alignment includes a group of pictures (GOP) alignment amongst the first video stream and the second video stream. In other instances, segment alignment and time alignment are achieved. Additionally, the method may include determining whether to begin encoding for a certain frame after the first encoding element is initiated. The output can be provided in conjunction with applying an adaptive bit rate protocol configured to ensure that timestamps associated with particular frames are synchronized.

In more detailed provisioning examples, the method may include computing a frame count based on a timecode, which is inclusive of a date and a time of day associated with at least one of a plurality of incoming frames. The method may also include using the frame count in order to determine whether encoding should begin on an instant incoming frame. In yet other instances, the method may include storing an initial capture time to serve as a timestamp for subsequent encoding.

Example Embodiments

Figure 1:
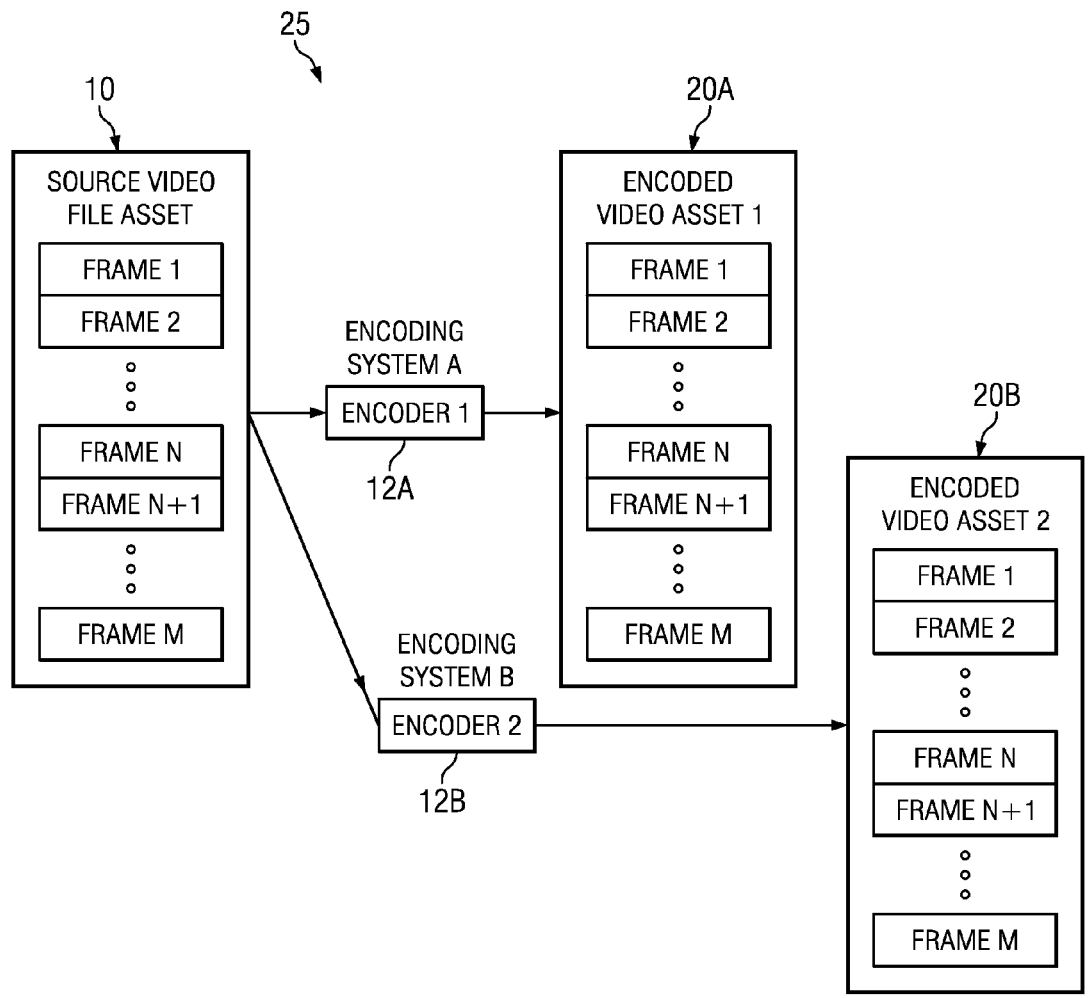
FIG. 1 is a simplified block diagram illustrating an example video environment.

Turning to FIG. 1, FIG. 1 is a simplified block diagram illustrating a communication system 25 that may be configured for providing dynamic time synchronization for video data. In this particular implementation of FIG. 1, communication system 25 includes a source video file asset 10 in which M frames are encoded by a first encoding system 12A (e.g., encoder 1). Additionally, communication system 25 includes a second encoding system 12B (e.g., encoder 2). The first encoding system is configured to encode the source video into a first encoded video asset 20A including M frames, while the second encoding system is configured to encode the source video into a second encoded video asset 20B, which similarly includes M frames. The M frames of the first encoded video asset 20A can correspond to the M frames of the second encoded video asset 20B on a frame-by-frame basis having the same timestamps.

Note that before turning to additional activities associated with the present disclosure, certain foundational information is provided in order to assist the audience in understanding fundamental problems encountered in streaming video. Adaptive bit rate streaming is a technique used in streaming multimedia over computer networks. While in the past most video streaming technologies used streaming protocols, current adaptive streaming technologies are almost exclusively based on hypertext transfer protocol (HTTP) and, further, configured to work efficiently over large distributed HTTP networks (e.g., the Internet).

Adaptive bit rate protocols can effectively detect a user's bandwidth and central processing unit (CPU) capacity in real time and subsequently adjust the quality of a video stream accordingly. Adaptive bit rate protocols leverage an encoder, which can encode a single source video at multiple bit rates.

The term 'encode' is broad and includes any type of conversion, formatting, or changing of data (e.g., for the purpose of standardization, speed, secrecy, security, compatibility, performance, or saving space by shrinking size). The player client can switch between streaming the different encodings depending on available resources. Ideally, the result of these activities is minimal buffering, prompt start times, and an overall good experience for both high-end and low-end connections. Consumers of streaming media can experience exceptional performance when adaptive bit rate streaming is used because the user's network and playback conditions are systematically adapted to align with changing conditions.

The media and entertainment industry are the main beneficiaries of adaptive bit rate streaming. As the video space grows exponentially, content delivery networks and video providers can provide customers with a superior viewing experience. Adaptive bit rate technology requires less encoding, which simplifies overall workflows and simply creates better results for the end users (i.e., the audience for which the video streams were intended).

In practical terms, for traditional television linear applications, there is a single representation of what is being shown on the screen. By contrast, when consumers opt to watch on-line video content (e.g., Netflix), they are given the choice to select among versions of the content having different bit rates. A consumer may then choose to watch the content at the highest bit rate, but that is less than their known maximum data rate. For example, a sports broadcaster might produce live content at bit rates of 1.2 Mb/s, 800 kb/s, 400 Kb/s, etc. Typically, the higher the encoded bit rate, the higher the video quality being provided to end users.

Consumer viewing experiences can be hindered when consumers are forced to choose from amongst a small set of data rates and, further, because among these rates, the consumers have to choose a rate that happens to be less than their expected sustainable Internet speed. If the consumer's download speed is not sustained at a speed that is at least equal to the video bit rate, then the viewing experience will occasionally be interrupted by pauses, as more video is fetched from the source. These pauses, often referred to as re-buffering, also affect the quality of the viewing experience. Since it is unlikely that end users will actually experience their maximum achievable download speed, they are relegated to choose a bit rate much lower than their maximum download speed unless they are willing to suffer periodic stream re-buffering. The implication of having to choose a lower video bit rate means that a consumer's actual download capacity may not be fully utilized and, therefore, the quality of video service may not be maximized.

Consider an application in which someone is watching television on an iPad (e.g., through a Netflix streaming scenario). The bandwidth is not fixed in this scenario, as it may vary as the end user moves from one location to another. When a bandwidth issue arises, the video would likely stop, pause, and/or attempt to download more content. Adaptive bit rate protocols attempt to assuage these issues by adapting the video to the device, and adapting the bit rate to that which is available. In this way, pauses in the video are avoided. Note additionally that when streams are switched in the context of adaptive bit rate protocols, they have to be aligned.

Hence, adaptive streaming can be used to optimize the consumer's actual bit rate from moment to moment. The technique involves encoding a given video asset at a range of video bit rates. During the consumer's playback, the delivery system can dynamically switch between the various rates depending on the actual download speeds the consumer experiences while watching the content. In such a scenario, the consumer does not have to initially choose a lower quality video experience. The consumer simply chooses to watch a given video asset, and the best quality video stream that is achievable based on their momentary download speed that is dynamically delivered to them. If their download speed goes down, the video stream that is being delivered to them is switched to a lower bit rate stream. If the consumer's download speed goes up, a higher bit rate stream is delivered.

A digital video signal, also known as a video stream, includes a sequence of video frames. Each frame has a timestamp associated with it describing the time when the frame is to be displayed relative to other frames in the stream. When two streams of the same video signal having different bit rates are provided, as in adaptive streaming, switching between streams should be seamless such that frames continue to be displayed in the proper order and are displayed at the time specified in the timestamp.

In order to cleanly switch to a new stream, a certain frame relationship (which is accurate) should exist between the current stream and the new stream. Stated in different terms, proper display of the video signal requires knowledge of the next frame in the new stream. Thus, if a delivery system is currently displaying frame N of a stream, the delivery system needs to know the location of frame N+1 in the new stream for switching to the new stream. Having a frame-accurate relationship between video streams means that there is a frame-to-frame correspondence between frames in multiple different video streams, which are generated from the same input source, but which may have different encoding parameters such as bit rate, picture size, etc.

The task of having a frame-accurate relationship is simple when the source video asset being encoded is a file-based asset: meaning that the frames already exist on a storage medium such as a hard disk. A file asset has a fixed set of frames and timestamps associated with those frames. The asset can be encoded many times, perhaps even on different machines, and, in each output file, a given frame N can have the same timestamp in the encoded output.

Figure 2A:
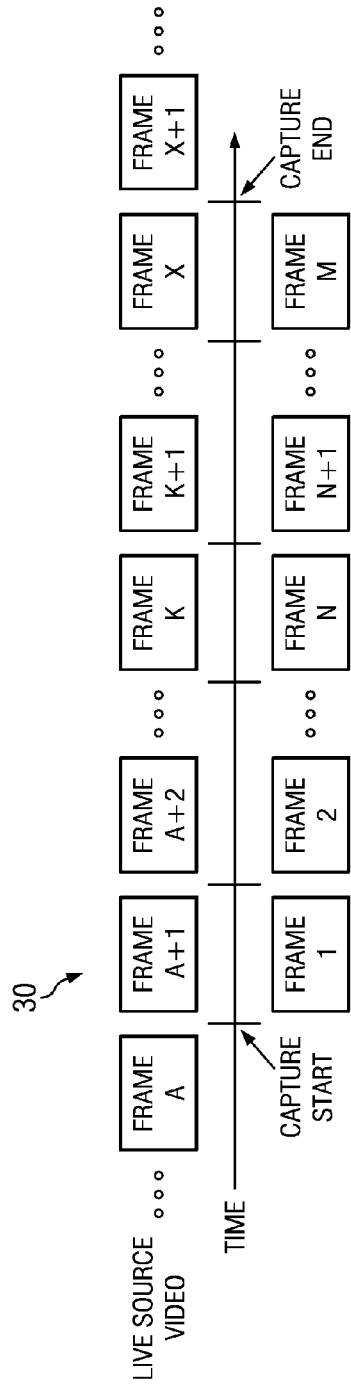
FIG. 2A is a simplified block diagram illustrating a live source video implementation.

Turning to FIG. 2A, FIG. 2A is a simplified block diagram illustrating an architecture 30 that includes a live source video. Note that a live asset, such as a live video feed, does not have a fixed set of frames and timestamps associated with those frames. However, when the capture of live video starts, it is typical for the first frame captured to be considered frame 1 having a timestamp of 0. Thereafter, frame numbering and timestamps can increment just as if the asset were from a file. For example, FIG. 2A illustrates capture of video from a live video source, where the capture started at frame A+1 of the source live stream. The first captured frame in the captured video file is typically referred to as frame 1 and has a timestamp of 0. Therefore, the task of having a frame-accurate relationship is somewhat straightforward when the source video asset being encoded is live, and where the frames feeding multiple encoders are sourced from a single capture system. Starting capture at a specific time code can solve the problem of a synchronous start across multiple encoders because all encoders start on exactly the same frame. However, such a method precludes the possibility of a system restarting after failure.

Figure 2B:
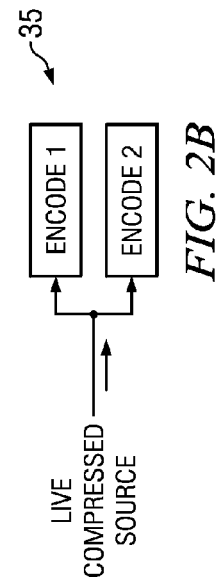
FIG. 2B and FIG. 2C are simplified block diagrams illustrating encoding of a compressed video source.
Figure 2C:
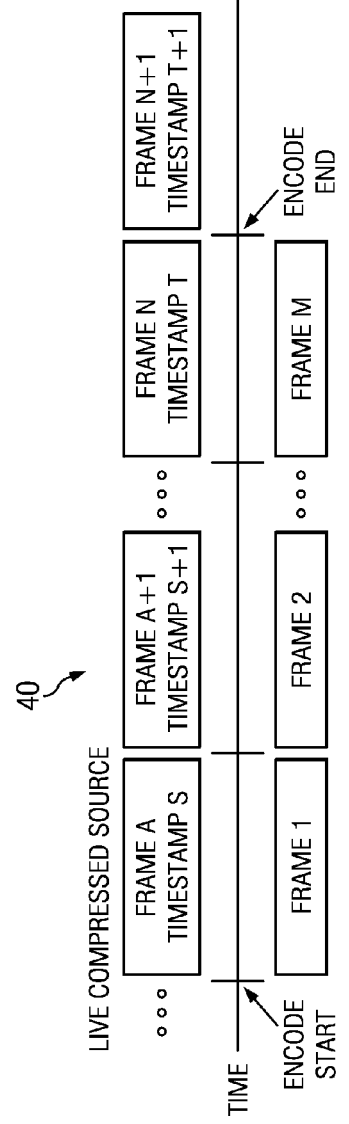

FIG. 2B is a simplified block diagram illustrating an architecture 35 associated with a live compressed source. In addition, FIG. 2C is a simplified block diagram illustrating an architecture 40 configured for encoding a compressed video source. For FIG. 2B, this type of encoder is typically called a transcoder because the source is compressed and the transcoder should first decode the source before it encodes it. The source-compressed stream is typically delivered over an Internet protocol (IP) transport mechanism to the transcoder. Much like the start of encoding activities of uncompressed video sources, a transcoder (as illustrated in FIG. 2C) would also start transcoding at some source video frame.

Compressed video sources differ from uncompressed sources in a variety of ways. Uncompressed video is typically distributed so that the same video frame arrives synchronously at the input of every encoder. In an IP video distribution, various network factors can lead to a skew (of arrival) for the same data to each encoder. Fortunately, the signal of compressed video sources natively carries a timestamp for every video frame, which is being depicted in FIG. 2C.

FIG. 3 is a simplified block diagram illustrating an architecture 45 that includes two encoders, which are receiving a live compressed source. An overall encoding architecture 50 can be provisioned as a single system including multiple encoders (as is being illustrated in FIG. 3), or multiple encoding systems. In each scenario, there remains a single capture source for the video frames. In the system illustrated in FIG. 3, a captured video stream is encoded at different bit rates using first and second encoders (Encoder 1 and Encoder 2). In the system of FIG. 3, the two encoders are implemented in a single capture and encoding system, while in other systems, two encoders can be implemented as separate encoding systems that receive captured video frames from a single common capture system. The number of output streams in the single live encoding system illustrated in FIG. 3 is limited by the overall processing capabilities of the encoding system (processor, memory, I/O, etc.). This system architecture also does not handle failure well. If a fault occurs at the single live capture system, all of the output streams may be lost.

The quality and/or scalability of an adaptive streaming model may be directly related to the number of encoding rates that can be produced for a given asset. For example, producing just three encoding rates such as 200 Kb/s, 800 Kb/s and 1.4 Mb/s (e.g., 600 Kb/s spacing between encoding rates) is not as scalable as having 5 rates at 200 Kb/s, 500 Kb/s, 800 Kb/s, 1.1 Mb/s and 1.4 Mb/s (300 Kb/s spacing), which is not as scalable as having 9 rates at 200 Kb/s, 350 Kb/s, 500 Kb/s, 650 Kb/s, 800 Kb/s, 950 Kb/s, 1 Mb/s, 1.25 Mb/s and 1.4 Mb/s (150 Kb/s spacing). More bit rates are better from a playback standpoint because the visual transitions between streams may be less noticeable.

Figure 4A:
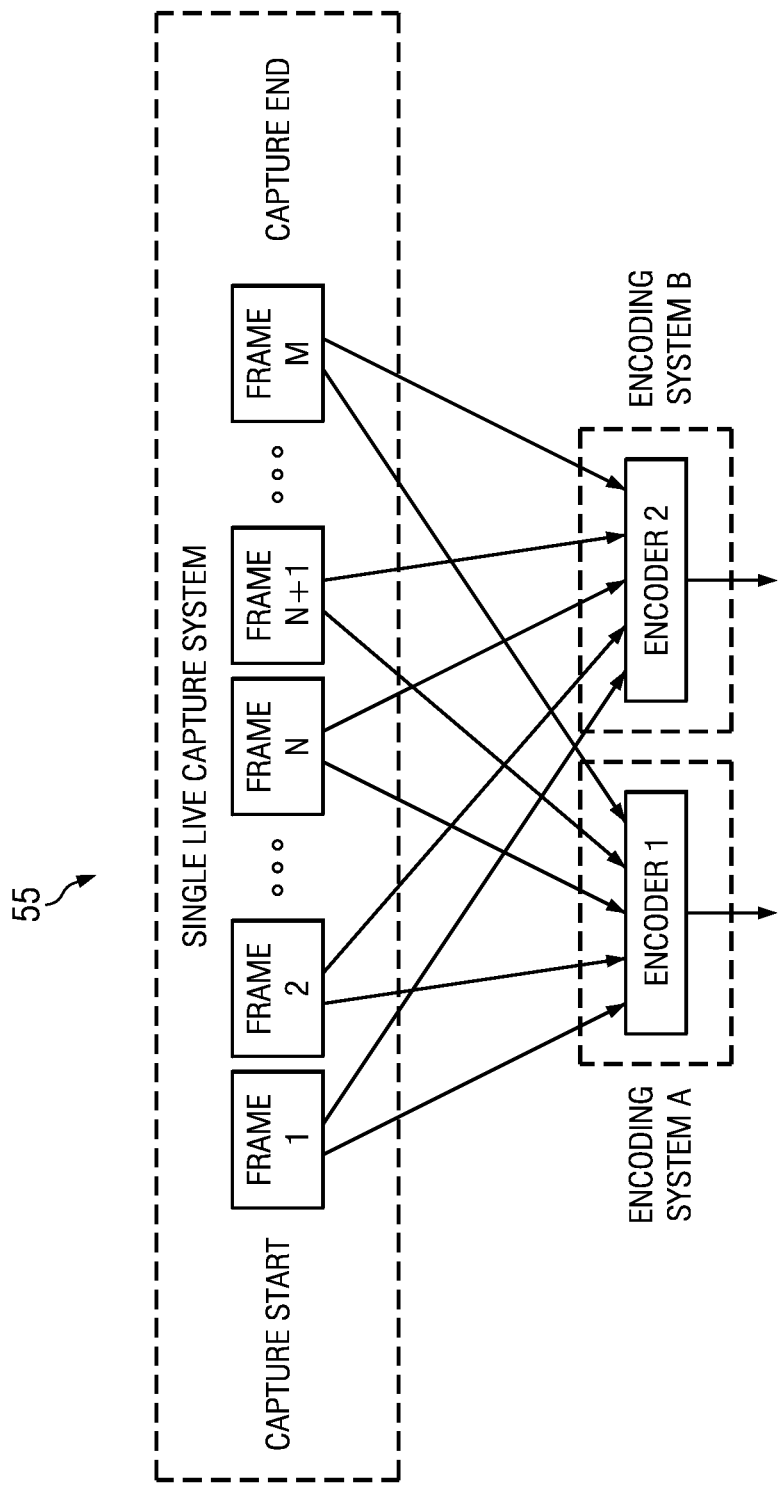
FIG. 4A is a simplified block diagram illustrating a capture and encoding system including a single live capture system and multiple encoder systems that are separate from the capture system.

FIG. 4A is a simplified block diagram illustrating an architecture 55 including a single live capture system and multiple encoders that are separate from the capture system. At first impression, the architecture of in FIG. 4A offers apparent infinite scalability and more robust failure handling. Any number of encoders can be added to the architecture, where if a single system fails, only a single adaptive stream is lost. Although if the single capture system fails, all adaptive streams may be lost. It should be noted that, since there is a single capture system providing frames and associated timestamps, this architecture does allow for restart of a failed system. The restarted system can begin encoding again and start providing streams that are frame-accurate relative to streams generated by the other encoders.

In operation, for the capture of uncompressed video, the architecture shown in FIG. 4A may be impractical, as it relies on a single capture system feeding uncompressed captured video to multiple encoding systems. Uncompressed video is large (high-definition (HD) uncompressed video in 4:2:2, 8-bit format requires nearly 1 Gb/sec for transmission), and the network requirements to deliver uncompressed video feeds to a scalable number of encoding machines are not practical.

Figure 4B:
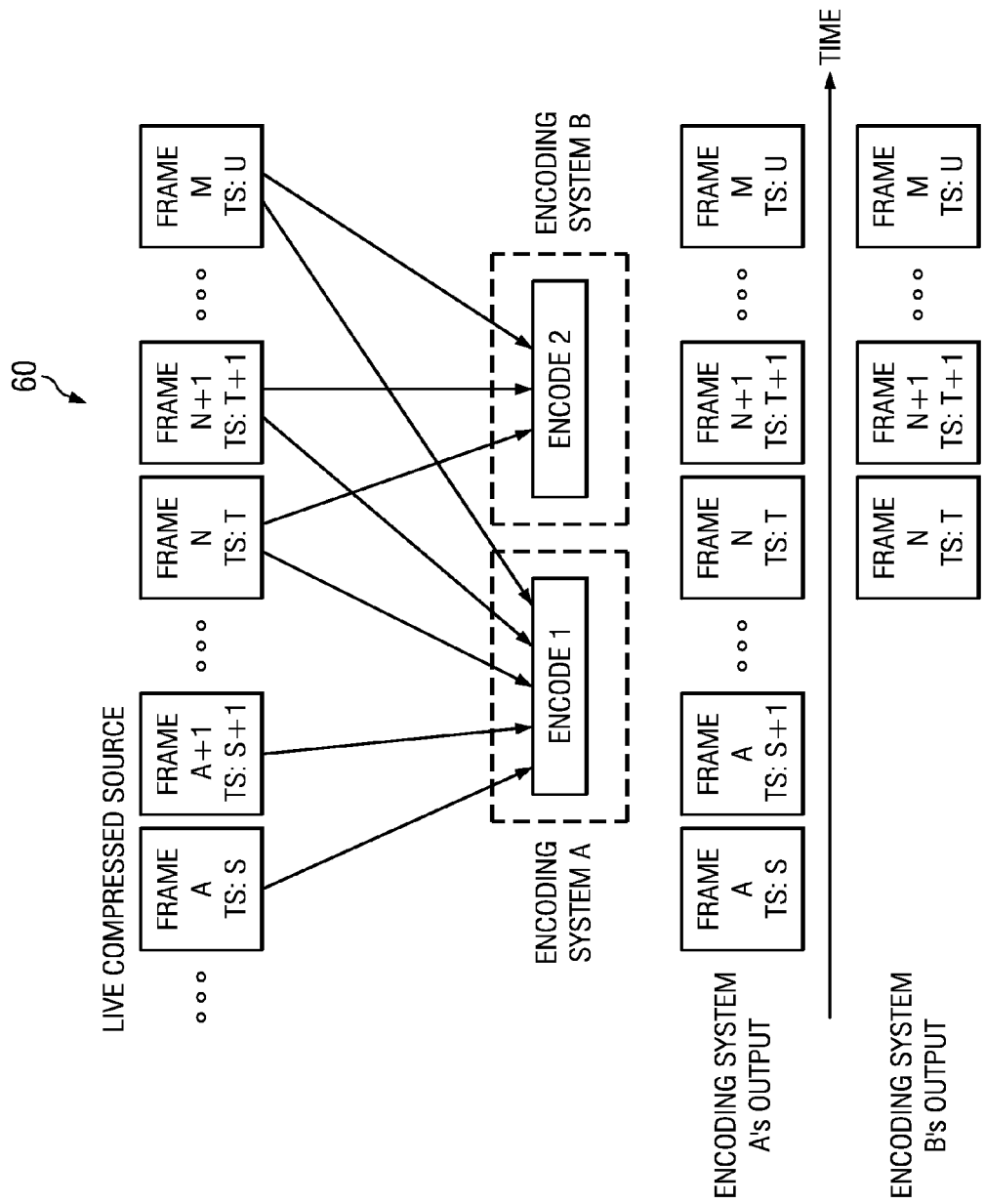
FIG. 4B is a simplified block diagram illustrating a capture and encoding system for encoding a live compressed source with multiple encoder systems.

FIG. 4B is a simplified block diagram illustrating a capture and encoding system 60 for encoding a live compressed source with multiple encoders. If multiple encoding systems were to adopt the timestamps originating in the compressed source, this would allow these systems to start at different times and yet produce output frames with the same timestamps. However, certain problems are encountered in using this approach. For example, many output video formats require linear (systematically) increasing timestamps. Second, the timestamps of most compressed video sources not only wrap periodically, but they may also have forward or backward discontinuities. Because of this, encoding systems starting at arbitrary times are challenged to produce frame-accurate output timestamps relative to other streams from other systems.

Figure 5A:
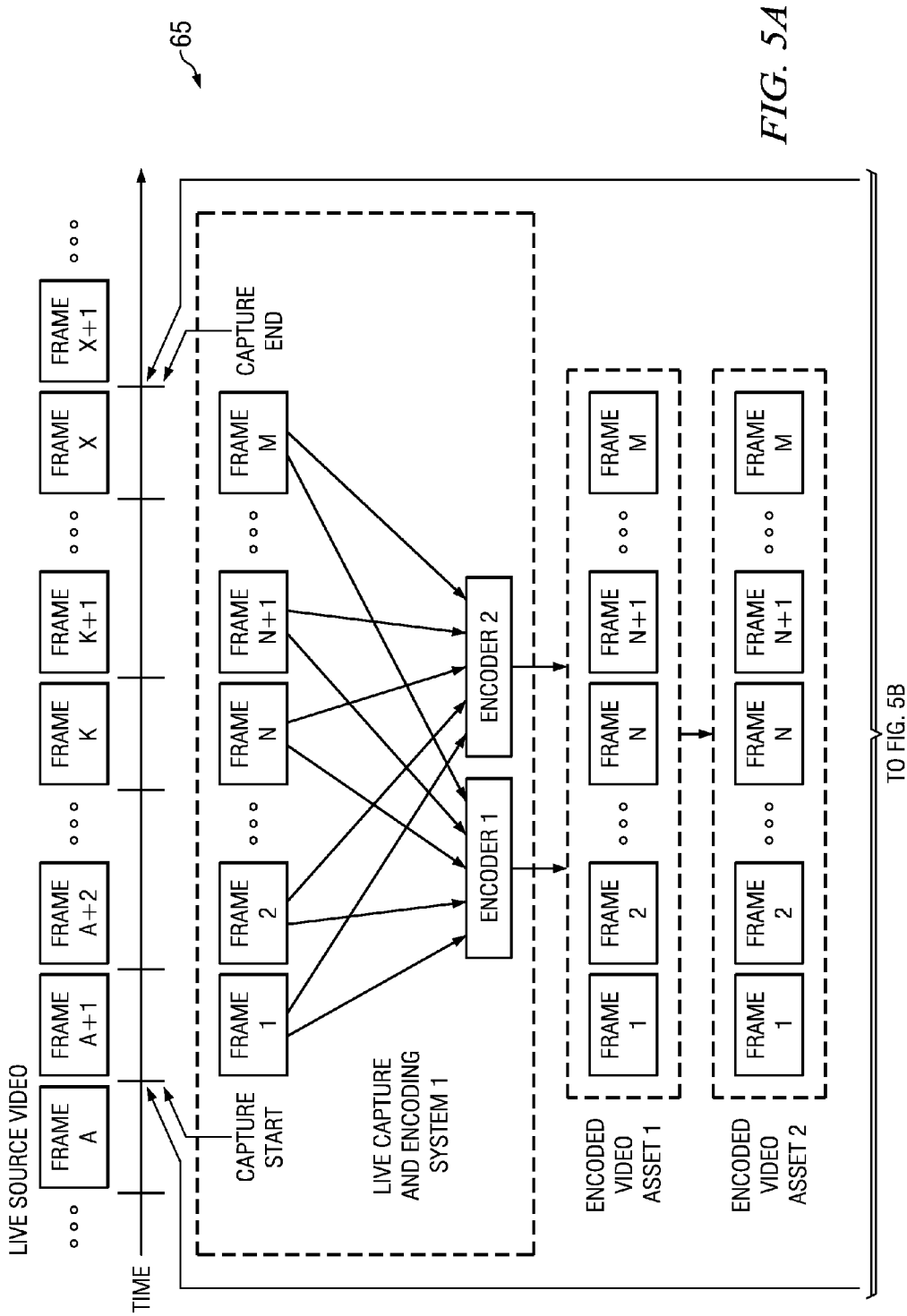
FIG. 5 is a simplified block diagram illustrating a capture and encoding system including a live capture subsystem with multiple encoders.
Figure 5B:
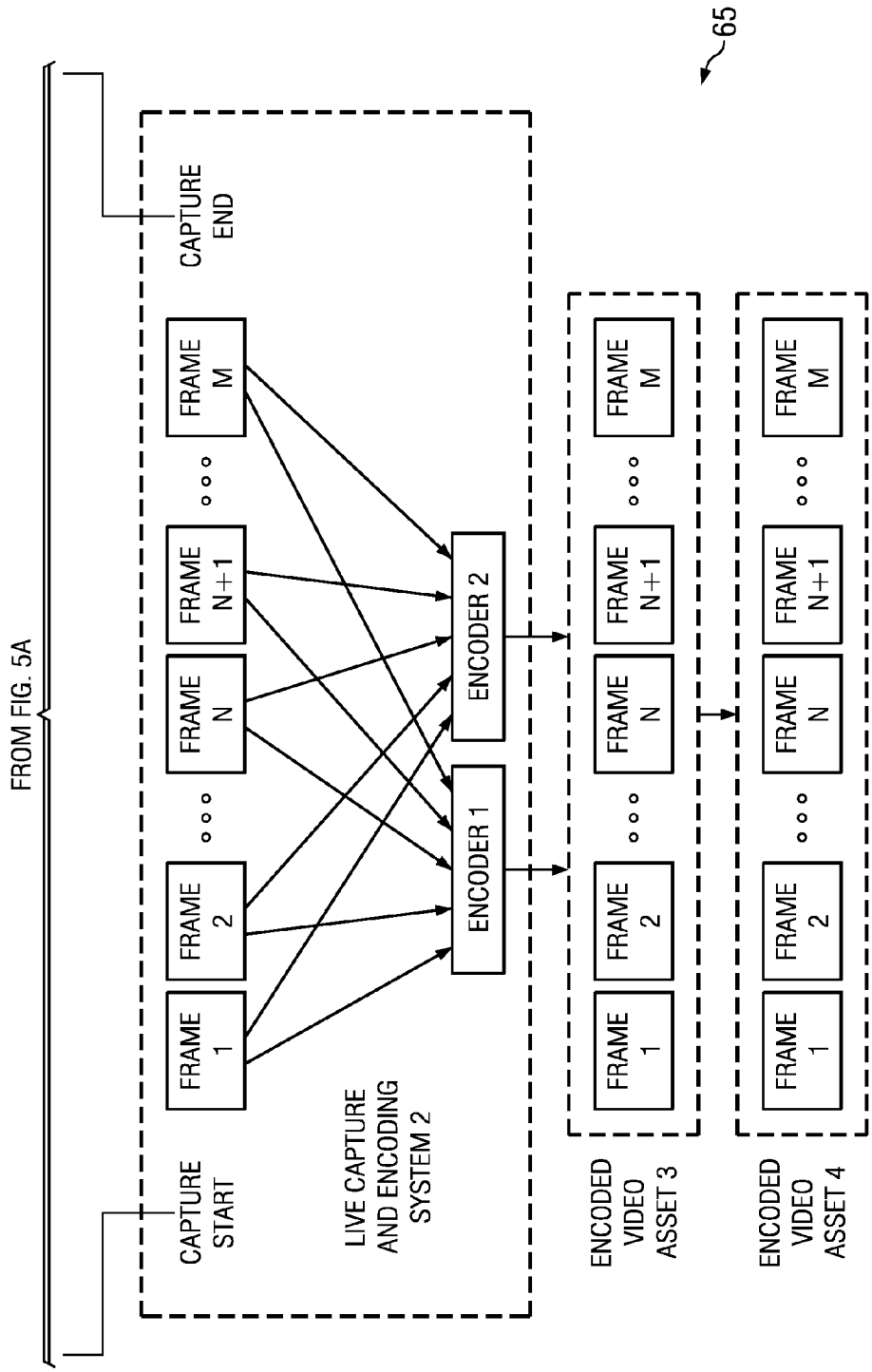

FIG. 5 is a simplified block diagram illustrating a capture and encoding system 65 including multiple live capture subsystems with multiple encoders. This particular architecture is configured to use common live encoding systems (live Encoding System 1 and live Encoding System 2), which are not fed uncompressed video from a single capture system. If a single capture and encoding system fails, then a subset of adaptive streams may be lost. There is also no single point of failure in the capture and encoding components that affects all adaptive streams. However, this architecture still has certain limitations. For example, in order to have a frame-accurate relationship among encoded outputs, each live encoding system should start encoding on the same frame. By doing so, frame N of one output will be the same frame N in another output. If the encoding systems do not start synchronously with each other, this requirement would not be met.

Figure 6:
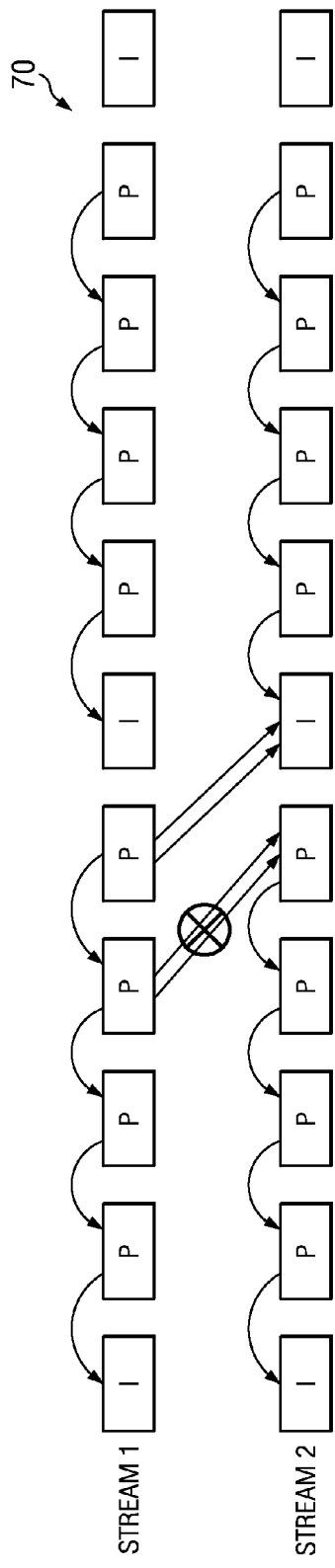
FIG. 6 is a simplified schematic that illustrates switching between video streams including I-frames and P-frames.

FIG. 6 is a simplified schematic that illustrates switching between video streams including I-frames and P-frames (generally indicated at arrow 70). In general, an adaptive streaming technique cannot simply switch from one encoded stream to another on any arbitrary frame N. This is because video encoding involves compression. To accomplish video compression, some frames are encoded using information from previous and/or future frames. FIG. 6 depicts video streams (stream 1 and stream 2) containing I-frames (frames that do not depend on other frames) and P-frames (frames that depend on one or more previous frames). When switching between stream 1 and stream 2, the switch point cannot occur at a point where the next frame of stream 2 is a P-frame because that frame depends on previous frames of stream 2 that have not been delivered. The switch point should be at an I-frame of stream 2, since the I-frame of a new stream does not depend on other frames in its stream.

Figure 7:
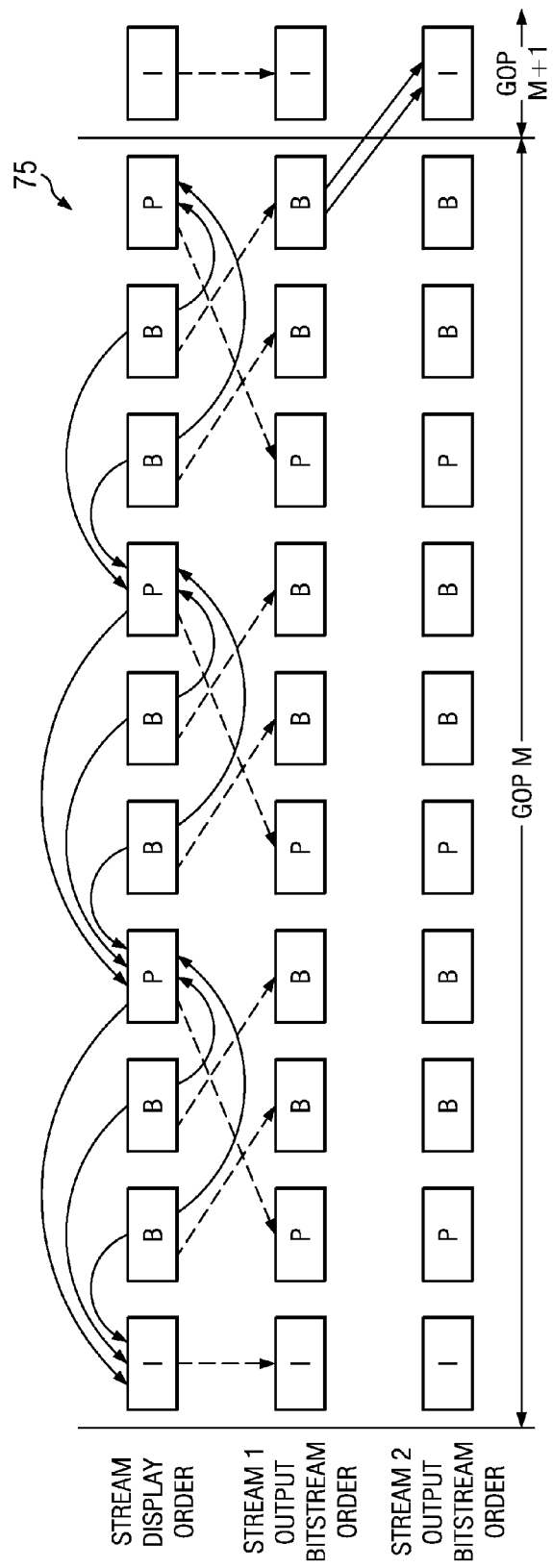
FIG. 7 is a simplified schematic that illustrates switching between aligned video streams including I-frames, P-frames, and B-frames.

FIG. 7 is a simplified schematic that illustrates switching between aligned video streams including I-frames, P-frames, and B-frames (generally indicated at arrow 75). FIG. 7 depicts video streams (stream 1 and stream 2) containing I-frames, P-frames, and B-frames (i.e., frames that depend on one or more previous and future frames). Furthermore, this scenario offers a special case, where the Group of Pictures (GOP) is considered closed because in bitstream order (i.e., the order in which frames are transmitted, which is different from the order in which they are displayed), there are no encoded frames that depend on frames from the previous and following GOPs.

In the field of video encoding, this closed GOP nature is a restriction required for the ability to switch or splice streams at GOP I-frame boundaries. As in the previous example, a clean switch should be at an I-frame GOP boundary since the I-frame of a new stream does not depend on other frames in its stream and, further, because of the closed GOP nature, future frames of the switched stream do not depend on frames that are prior to the I-frame either. When encoding systems produce only I-frames and P-frames, no special GOP relationship has to exist among streams. When switching to a new stream, the switch has to simply be to an I-frame.

FIG. 8 is a simplified schematic that illustrates aligned and unaligned switching for video streams including I- and P-frames (generally indicated at arrow 80). In FIG. 8, stream 1 and stream 2 include only I-frames and P-frames, so the bitstream order of the streams is the same as the display order. Stream 1 and stream 2 have aligned GOPs. However, stream 3 is different (its I-frames are not on the same frames as the I-frames of stream 1 and 2). It is permissible to switch, for example, from stream 2 to stream 3 as shown in FIG. 8, as switching is simply to an I-frame of a new stream.

When encoding systems produce streams that include B-frames, to cleanly switch from frame N of one stream to N+1 of another stream, the streams have to be GOP aligned at the switch point. Stated in different terms, the I-frames should occur at the same point in both streams. FIG. 9 is a simplified schematic that illustrates aligned switching for video streams including I-frames, P-frames, and B-frames (generally indicated at arrow 90). In FIG. 9, switching from stream 1 to stream 2 is permissible, but switching to stream 3 is not permissible because the GOP of stream 3 is not aligned with that of the other streams.

Figure 10:
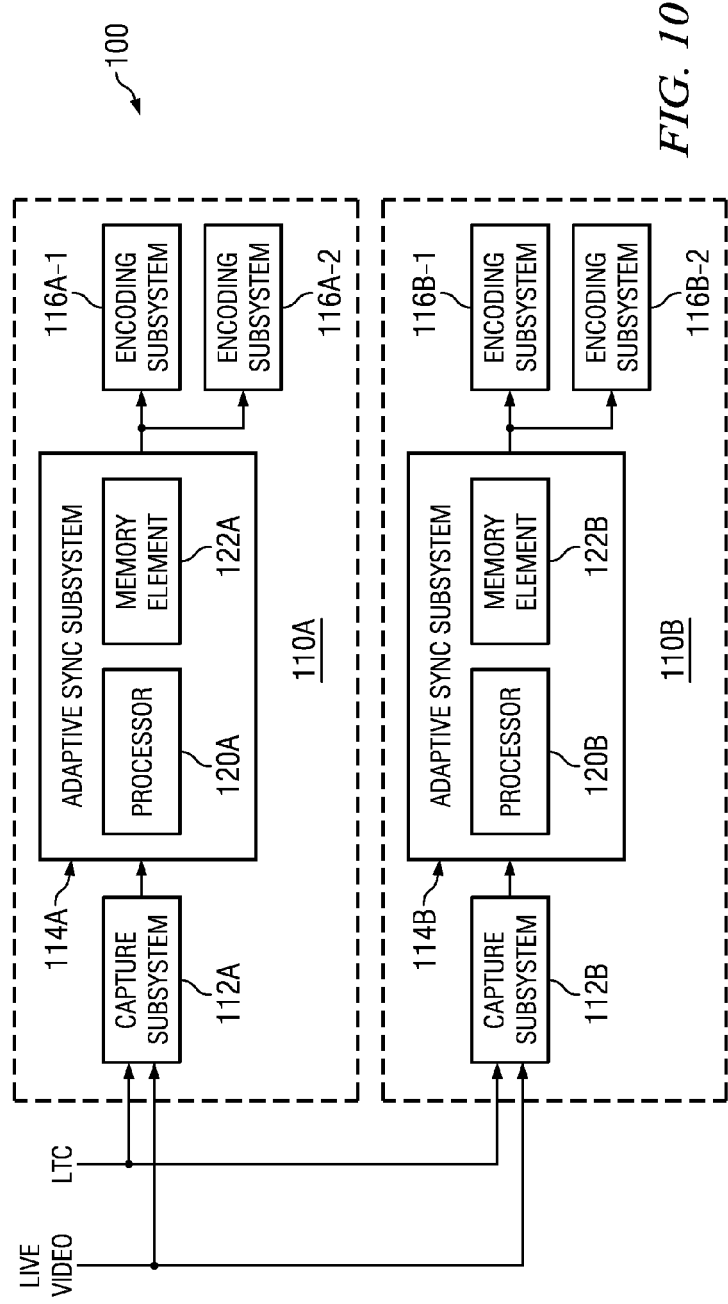
FIG. 10 is a simplified block diagram illustrating a live video capture and encoding system according to certain embodiments of the present disclosure.

FIG. 10 is a simplified block diagram illustrating a live video capture and encoding system 100 according to certain embodiments of the present disclosure. Encoding system 100 is configured for allowing live encoding systems to start asynchronously from each other, while maintaining a frame-accurate, time-based association of output frames. Additionally, certain embodiments of the present disclosure can further be configured for causing these output streams to be GOP aligned with one another.

In operation, the architecture of FIG. 10 can provide a platform for generating a frame accurate timestamp that is synchronized across two or more encoding systems, where the platform is configured for applying the frame-accurate timestamp to encoded video frames in multiple output streams. Certain embodiments of the present disclosure can use multiple capture and encoding systems to process a live video stream to generate a plurality of encoded video assets, which are encoded using different encoding parameters (bit rate, image size, etc.), but that are encoded with a common frame-accurate timestamp, which is the same from asset to asset.

In more specific implementations, the architecture of FIG. 10 is configured to generate the common timestamps in response to time codes that are provided along with a video signal. Two examples of time codes that can be provided with a video signal are Vertical Interval Time Code (VITC), which is embedded in the video signal and Linear Time Code (LTC), which is external (but synchronous) to the video signal. Other forms of time code can be used, provided they are frame accurate. Amongst other things, VITC and LTC time codes provide information about the hour, minute, seconds, and frame number for a given frame.

In a "Non-drop" time code, the time code would increment once for every frame. For video rates that are an integer numbers of frames per-second, a non-drop time code can exactly represent the time of a video frame. However, many video encoding formats do not encode frames at an exact integer number of frames per second. Thus, another form of time code (referred to as a "Drop" time code) is often used. A Drop time code drops frame counts on in certain instances. For example, a Drop time code may drop two frame counts every minute except on the 10th minute. This helps to account for non-integer frame rates. However, each time code still does not exactly represent the real time of every given frame. Certain embodiments of the present disclosure account for this and operate both for Drop and Non-Drop time codes. For the purposes of the following discussion, an LTC time code will be used. However, it will be appreciated that a VITC time code or other time code may be used in certain embodiments of the present disclosure.

As shown in FIG. 10, encoding system 100 includes one or more capture and encoding subsystems 110A, 110B. Each capture and encoding subsystem 110A, 110B includes a capture subsystem 112A, an adaptive synchronization subsystem 114A, 114B for each capture subsystem, and one or more encoding subsystems 116A-1, 116A-2, 116B-1, 116B-2 for each capture subsystem. In addition, encoding subsystems 110A, 110B may each include a respective processor 120A, 120B, and a respective memory element 122A, 122B. In a particular implementation, each capture and encoding subsystem 110A, 110B is provisioned using a programmable digital computer including a memory, a processor, and appropriate communication interfaces for receiving a video signal and an associated time code. An encoded video signal generated by the capture and encoding subsystem 110A, 110B may be output by capture and encoding subsystem 110A, 110B, stored in a memory or other storage system, or both. Although two capture subsystems and associated adaptive sync and encoding subsystems are illustrated in FIG. 10, it should be appreciated that more than two capture subsystems could be provided according to certain embodiments of the present disclosure. Furthermore, although two encoding subsystems are illustrated per capture subsystem in FIG. 10, it should be appreciated that more than two encoding subsystems per capture subsystem could be provided according to certain embodiments of the present disclosure.

Encoding subsystems 110A, 110B, and processing entities (discussed below) are encoding elements that can exchange and process video data between two locations (e.g., a content source and/or sources in a given network). For example, such encoding systems may be provisioned in a cable television headend (e.g., a master facility for receiving television signals for processing and distribution over a cable television system), a gateway (i.e., for telecommunications), a single master antenna television headend, (SMATV) (e.g., used for hotels, motels, and commercial properties), personal computers (PCs), set-top boxes (STBs), personal digital assistants (PDAs), voice over Internet protocol (VoIP) phones, Internet connected televisions, cellular telephones, smartphones, consoles, proprietary endpoints, laptops or electronic notebooks, i-Phones, iPads, Google Droids, any other type of smartphone, or any other device, component, element, or object capable of initiating data exchanges within the architectures of the present disclosure.

More generally, and as used herein in this Specification, the term 'encoding element' is meant to encompass any of the aforementioned elements, as well as routers, switches, cable boxes, bridges, inline service nodes, proxies, servers, processors, modules, or any other suitable device, component, element, proprietary appliance, or object operable to exchange information in a video environment. These encoding elements may include any suitable hardware, software, components, modules, interfaces, or objects that facilitate the operations thereof. This may be inclusive of appropriate algorithms and communication protocols that allow for the effective exchange of data or information.

In one implementation, encoding subsystems 110A, 1106 and processing entities include software to achieve (or to foster) the video synchronization activities discussed herein. This could include the implementation of instances of adaptive sync subsystem 114, encoding subsystem 116, and/or capture subsystem 112. Additionally, each of these elements can have an internal structure (e.g., a processor, a memory element, etc.) to facilitate some of the operations described herein. In other embodiments, these synchronization activities may be executed externally to these elements, or included in some other network element to achieve the intended functionality. Alternatively, encoding subsystems 110A, 1106 and/or processing entities may include software (or reciprocating software) that can coordinate with other devices and elements in order to achieve the synchronization activities described herein. In still other embodiments, one or several devices may include any suitable algorithms, hardware, software, components, modules, interfaces, or objects that facilitate the operations thereof.

Each capture and encoding system is configured to receive both a live video signal and a time code (e.g., LTC). The LTC may be a synchronous "house time" that is provided simultaneously to each capture subsystem 112A, 112B in encoding system 100. According to certain embodiments of the present disclosure, each encoding subsystem 116A-1, 116A-2, 116B-1, 116B-2 is configured to assign a common frame timestamp to each encoded frame that is based on the LTC such that the frame timestamp assigned to a frame by each encoding subsystem may be the same. In certain embodiments of the present disclosure, rather than providing an LTC to encoding system 100, each encoding subsystem may generate the common frame timestamp based on a synchronous external clock signal, such as a clock signal provided by an atomic clock, a GPS system, or other synchronous clock source.

Figure 11:
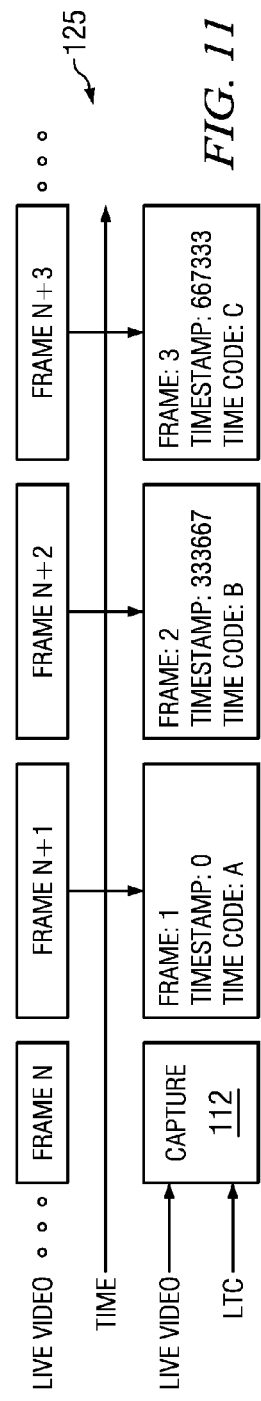
FIG. 11 is a simplified block diagram that illustrates an assignment of timestamps and time codes for frames captured from a live video stream according to certain embodiments of the present disclosure.

FIG. 11 is a simplified block diagram that illustrates (generally at arrow 125) an assignment of timestamps and time codes for frames captured from a live video stream according to certain embodiments of the present disclosure. FIG. 11 includes a video capture subsystem 112 according to certain embodiments of the present disclosure. A sequence of live video frames is fed to video capture system 112. The system is also provided time code information such as LTC information. At a certain point in time, the capture system starts to capture video frames. The first captured frame is referred to here as Frame 1; it has a capture timestamp of 0 and has a time code associated with it. The time code of Frame 1 is illustrated in FIG. 11 as Time Code A; however, it will be appreciated that the time code may be a numeric code in a standard time code format, such as SMPTE format, which includes fields for date, hours, minutes, seconds, and frames. The next frame captured is Frame 2, where it also has a time code associated with it, and its timestamp represents the time it was captured referenced from time 0. Timestamps shown are in hundred-nano-second units (HNS).

To allow multiple capture/encoding systems to have synchronous streams, the timestamp of any given frame in the encoded streams is the same across all streams regardless of when the systems started capture and encoding. To accomplish this, certain embodiments of the present disclosure utilize the time code supplied to the capture and encoding system and a base time code to compute the timestamp of frames to be encoded.

Figure 12:
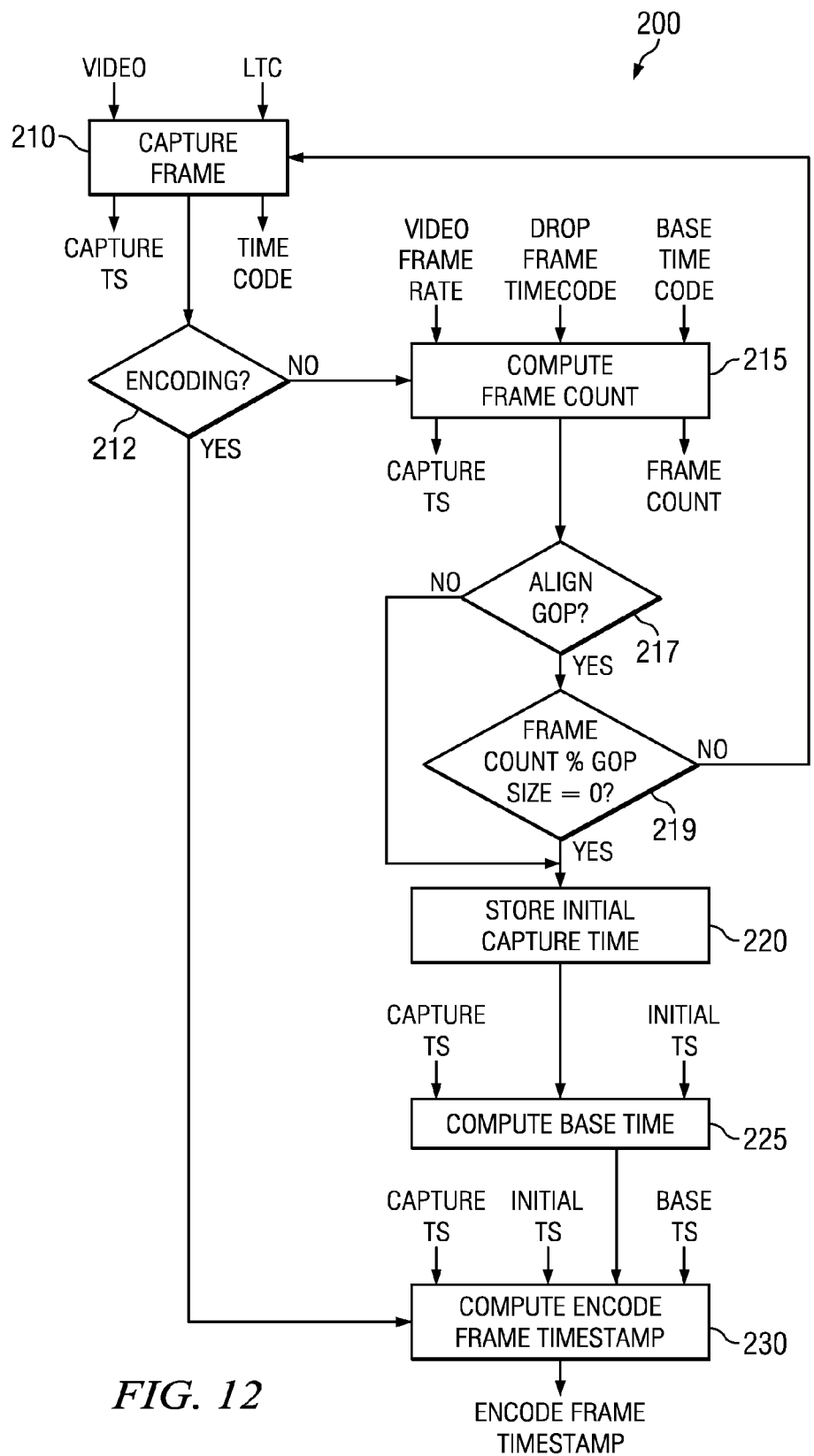
FIG. 12 is a simplified flowchart that illustrates a protocol for generating synchronous timestamps according to certain embodiments of the present disclosure.

FIG. 12 is a simplified flowchart 200 that illustrates a protocol for generating synchronous timestamps according to certain embodiments of the present disclosure. When a frame is captured (block 210), it is assigned a Capture Timestamp by capture subsystem 112 and a time code obtained from the LTC input. If the encoders are not yet encoding video frames (as will be the case when the system first begins to capture frames), the architecture would first compute the number of frames (Frame Count) that have been in the live stream since a specific earlier base time: represented by a base time code (block 215). For illustrative purposes in this example, a base time with a base time code of 0:0:0:0 on the same day is assumed (or a time code that incorporates date information may be used), although the use of other base times is possible. To compute the Frame Count, the number of seconds from the base time is calculated first using information from the LTC time code, which contains Hours, Minutes, Seconds, and Frames (in addition to other data).

$$[\text{Total Seconds} = \text{Hours}*3600 + \text{Minutes}*60 + \text{Seconds}] \quad (1)$$

$$[\text{Total Minutes} = \text{Total Seconds}/60] \quad (2)$$

The Frame Count is then computed. First, the Frame Rate, expressed as an integer number of frames per second, is calculated as follows:

$$(\text{Integer}) \text{ Frame Rate} = (\text{Integer})((\text{Double}) \text{ Frame Rate} + 0.5) \quad (3)$$

The Frame Count is then simply the frame rate multiplied by the total number of elapsed seconds since the base time, plus the number of frames from Frames field of the time code, as follows:

$$\text{Frame Count} = \text{Total Seconds} * \text{Integer Frame Rate} + \text{Frames} \quad (4)$$

If the time code is not a Drop Frame Time code, then the Frame Count within a given day accurately represents the total number of frames. However, if the Time code is a Drop Frame Time code, then the Frame Count is adjusted as follows to account for the periodic frame count drops of Drop Frame Time code:

$$\text{Frame Count} = \text{Frame Count} - 2*\text{Total Minutes} + 2*(\text{Total Minutes } 11/0) \quad (5)$$

FIG. 12 can be reflective of the scenario in which an encoding system has just come online (i.e., been initiated in some way). At 215, the system attempts to determine whether it should begin encoding. A frame count is computed based on a time code that may be inclusive of a date, time of day (e.g., 10:03 AM: 52 seconds, 21 milliseconds) associated with an incoming frame. Hence, from a virtual point in time, the architecture is able to determine (from some base period of time) a computed frame count (i.e., how many frames will the system have encoded from this point in time, if the system were initiated at this base period of time). From the frame count metric, the system can determine whether it should begin encoding on the instant frame. For example, referring back to FIG. 9, the transition being marked as impermissible would not occur based on accurate frame count (for stream 3) because it would not be aligned with the virtual timeframe.

If the ensuing frame were to be in alignment with the frame count (alignment with GOP at 217), then encoding can commence. The initial capture time that is stored in 220 can be viewed as a timestamp. The subsequent encoding can be relative to that timestamp. The first frame can include a timestamp 0 (at 225). From here, the initial timestamp can be aligned to the other streams. In this sense, the frames are aligned and the timestamps are synchronized. Thus, the architecture is accomplishing two fundamental objectives. First, the output frames are aligned at appropriate frame boundaries. Second, there is a time sync, which may include a GOP alignment, segment alignment, and a time alignment.

In operation, to provide for synchronous GOP structures across multiple encoding systems, a constraint is imposed on the first frame passed from the capture subsystem to the encoding subsystem. This is only needed if GOP alignment is required. This constraint would be: Frame Count Mod GOP Size Should Equal 0. This ensures that the first frame that is passed to the encoding system is the first frame of a Group of Pictures Thus, after the Frame Count is computed in block 215, a check is made at block 217 to see if it is necessary to align the GOPs across multiple encoded streams. If this were not necessary, operations would continue to block 220. However, if GOP alignment is required, a check is made to see if the current frame is at the beginning of a GOP, by comparing the quantity (Frame Count mod GOP size) to zero. If Frame Count mod GOP size is zero, then the current frame is at the beginning of a Group of Pictures, and operations would proceed to block 220.

However, if the Frame Count mod GOP size is not zero (i.e., the constraint is not met), then the captured frame is ignored and the Frame Count is recalculated for the next captured frame. If the (Frame Count mod GOP size=0) constraint is not met on the first captured frame, the Capture Timestamp would not be 0 when the condition is met. To account for this, the Capture Timestamp of the first frame that meets the (Frame Count mod GOP size=0) condition is stored as the Initial Timestamp (block 220). A Base Timestamp is also calculated at this point (block 225):

$$\text{Base Timestamp} = \text{Frame Count} * 10000 * \text{\# of Milliseconds Per-Frame} \quad (6)$$

The Base Timestamp is established in HNS units based on the Frame Count of the first frame for which (Frame Count mod GOP size=0). Because the Base Timestamp is computed based on the total frame count since the base time, while the capture and encoding system may have started (or restarted) at a point in time after the base time, the Base Timestamp may be different from the Initial Timestamp. The Base Timestamp, the Capture Timestamp, and the Initial Timestamp may all be expressed in HNS units.

The final step is to produce the Encode Frame Timestamp (block 230) that will be the same across all of the encoding systems for any given frame. This is computed from the current Capture Timestamp, the Initial Capture Timestamp, and the Base Timestamp as follows:

$$\text{Encode Frame Timestamp} = \text{Base Timestamp} + (\text{Capture Timestamp} - \text{Initial Timestamp}) \quad (7)$$

The Encode Frame Timestamp that is used to encode the frame is equal to the Base Timestamp plus the offset between the Capture Timestamp and the Initial Timestamp. Like the Base Timestamp, the Capture Timestamp, and the Initial Timestamp, the Encode Frame Timestamp may be expressed in HNS units.

FIGS. 13A and 13B are timing diagrams (130 and 135) that illustrate example embodiments of generating synchronous timestamps. As shown therein, a Base Time having a Base Time code=(0:0:0:0) is defined. At some later point in time, a capture system begins to capture frames from a video signal. The capture system receives a time code, such as an LTC or VITC time code, that references the Base Time. When the system captures the first frame, it calculates the frame count $FC_n$, which represents the total number of frames that have been in the live video stream since the Base Time (see block 215 of FIG. 12). The first captured frame is then assigned a Frame Count of $FC_{n+o}$. The next frame is assigned a frame count of $FC_{n+1}$, and so on. Each frame is assigned a unique timestamp that is specific to the particular capture system in use. Thus, the first frame is assigned a Capture Timestamp of $CTS_0$ by the capture and encoding subsystem, the second frame is assigned a capture timestamp of $CTS_1$ by the capture and encoding subsystem, etc. The Capture Timestamp of a system may depend on when the system started receiving frames. Accordingly, the Capture Timestamp may vary from subsystem to subsystem.

Assuming GOP alignment is required, the system checks the Frame Count of each captured frame to determine if the next frame is GOP aligned with frames encoded by the other capture and encode subsystems (i.e., to see if FC mod GOP equals zero). In the example scenario being illustrated in FIGS. 13A-B, that condition is not met until the sixth captured frame, which is assigned $FC_{n+5}$. At that point, the Capture Timestamp $CTS_5$ of the frame is taken as the Initial Timestamp. Furthermore, the Base Timestamp is calculated as a function of $FC_{n+5}$, as follows:

$$\text{Base Timestamp} = FC_{n+5} * 10000 * \text{\# of Milliseconds Per-Frame} \quad (8)$$

Thus, the Base Timestamp is calculated based on the total number of frames that have been in the live video stream from the Base Time up until the time the Initial Timestamp is stored. The Encode Frame Timestamp for the initial frame (having Frame Count $FC_{n+5}$) is then calculated from Equation (7) as follows:

$$\text{Encode Frame Timestamp} = \text{Base Timestamp} + (CTS_5 - CTS_5) \quad (9)$$

Stated in different terms, the Encode Frame Timestamp for the initial frame is simply the Base Timestamp.

For the example of FIG. 13B, the Encode Frame Timestamp for the frame having frame count $FC_{n+8}$ is calculated from Equation (7) as follows:

$$\text{Encode Frame Timestamp} = \text{Base Timestamp} + (CTS_8 - CTS_5) \quad (10)$$

The Encode Frame Timestamp is updated in a similar manner for each successive captured frame using the Base Timestamp, the Initial Timestamp, and the Capture Timestamp of the captured frame.

An example using sample numbers in an NTSC video processing system having two capture systems and using a Drop time code is as follows:

NTSC Video: 30/1.001 Frames/Sec

Integer Frame=30

Drop Time code Used
A first system starts capture:

First Captured Time Frame Code (Drop Frame): 01:25:32:07

Total Seconds=1*3600+25*60+32=5132

Total Minutes=5132/60=85

Frame Count=5132*30+7=153967

Frame Count Adjusted for Drop Time code=153967−2*85+2*(85/10)=153813

Base Timestamp−153813*10000*1000*1.001/30=51322271000

A second system starts capture 944 frames later than the first system:

First Captured Frame Time Code (Drop Frame): 01:26:03:23

Total Seconds=5163

Total Minutes=86

Frame Count=154913

Frame Count Adjusted for Drop Time code=154757

Base Timestamp=154757*10000*1000*1.001130=51637252333

The first frame of the second system has an encode frame timestamp of 51637252333. The 944th frame of the first system will have an encode frame timestamp of: 51322271000+944*10000*1000*1.001130=51637252333. This illustrates that frames of both streams corresponding to the same source frame have the same timestamp. Therefore, even though they started asynchronously from each other, the two captured streams have frame-accurate synchronous timestamps. Moreover, the output encoded video streams may be GOP aligned. Therefore, switching from one encoded stream to the other encoded stream to accommodate changes in bandwidth is made easier.

Certain embodiments of the present disclosure may generate Encode Frame Timestamps in a manner that is computationally efficient, as the Encode Frame Timestamp may be calculated for each frame using only addition/subtraction of the Capture Timestamp, the Initial Timestamp, and the Base Timestamp. The Initial Timestamp and the Base Timestamp are generated at the beginning of encoding, and can be stored, for example, in a tightly coupled memory, such as a cache, for quick access. Accordingly, it may not be necessary to calculate a timestamp taking into account drop frames and non-integer frame rates based on the Base Time code each time a new frame is captured.

Furthermore, certain embodiments may only require sampling of the time code from the start of capture up to the point of GOP alignment. From that point on, the architecture is no longer required to sample the time code. This may be beneficial in cases where source time code may have periods of instability or discontinuities with the source video (for example, if the source of time code fails). In the case where the time code is guaranteed to be available and synchronous with the source video, a frame's encoded timestamp can be computed as a function of the frame's time code, as illustrated in FIG. 14.

Figure 14:
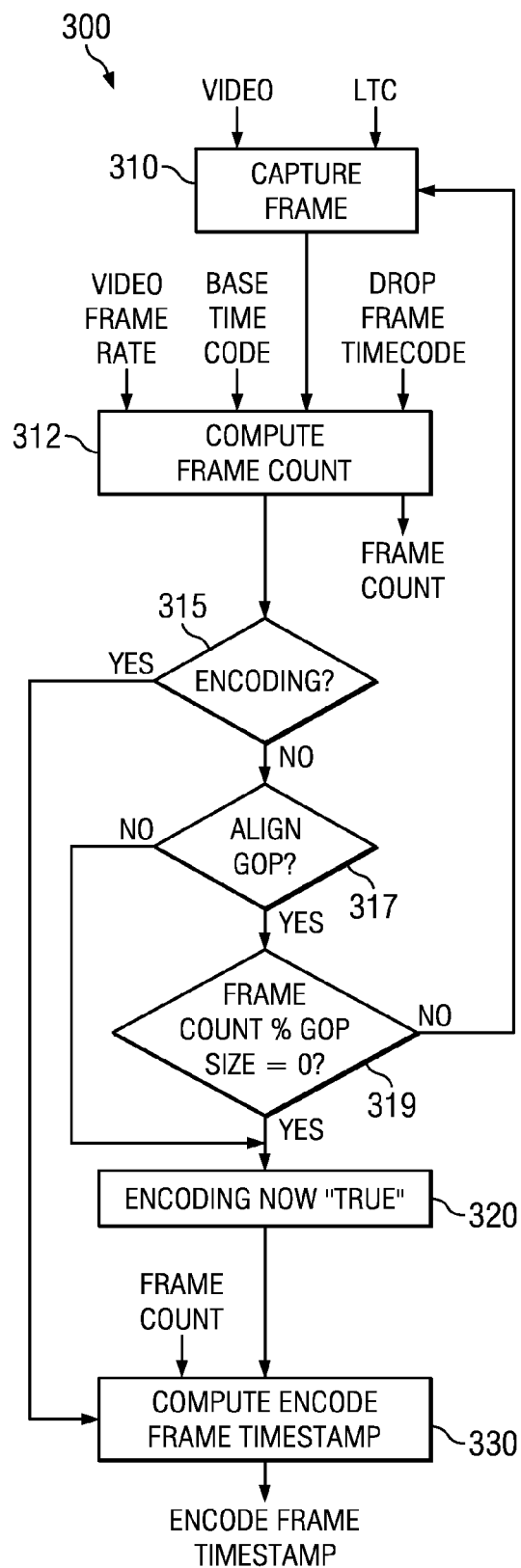
FIG. 14 is a simplified flowchart that illustrates a protocol for generating synchronous timestamps according to further embodiments.

FIG. 14 is a simplified flowchart 300 that illustrates a protocol for generating synchronous timestamps according to further embodiments. The flow may begin when a frame of video is captured (block 310), where it is assigned a time code (in this instance, obtained from the LTC input). The architecture may first compute the number of frames (Frame Count), which may have been in the live stream since a specific earlier base time (e.g., represented by a base time code (block 312)). For illustrative purposes in this instance, a base time with a time code of 0:0:0:0 on the same day is assumed, although the use of other base times is possible. To compute the Frame Count, the number of seconds from the base time is calculated first using information from the LTC timecode, which contains Hours, Minutes, Seconds and Frames (in addition to other data, such as date).

$$\text{Total Seconds} = \text{Hours} * 3600 + \text{Minutes} * 60 + \text{Seconds} \quad (1)$$

$$\text{Total Minutes} = \text{Total Seconds} / 60 \quad (2)$$

The Frame Count is then computed as follows. First, the Frame Rate, expressed as an integer number of frames per second, is calculated as follows:

$$(\text{Integer}) \text{ Frame Rate} = (\text{Integer})((\text{Double}) \text{ Frame Rate} + 0.5) \quad (3)$$

The Frame Count is then simply the frame rate multiplied by the total number of elapsed seconds since the base time, plus the number of frames from Frames field of the Time code, as follows:

$$\text{Frame Count} = \text{Total Seconds} * \text{Integer Frame Rate} + \text{Frames} \quad (4)$$

If the Time code is not a Drop Frame time code then the Frame Count within a given day accurately represents the total number of frames. However, if the time code is a Drop Frame time code, then the Frame Count is adjusted as follows to account for the periodic frame count drops of Drop Frame time code:

$$\text{Frame Count} = \text{Frame Count} - 2 * \text{Total Minutes} + 2 * (\text{Total Minutes}/10) \quad (5)$$

In block 315, the architecture is configured to determine if encoding is already occurring. If such is the case, then the architecture proceeds to compute the encode frame timestamp in block 320. However, if encoding has not yet started, then the architecture proceeds to block 317 to determine if GOP alignment is required. To provide for synchronous GOP structures across multiple encoding systems, a constraint is imposed on the first frame passed from the capture subsystem to the encoding subsystem. This is only needed if GOP alignment is required. This constraint is: Frame Count Mod GOP Size Should Equal 0. This ensures that the first frame that is passed to the encoding system is the first frame of a Group of Pictures.

Thus, after the Frame Count is computed in block 312, if not already encoding, a check is made to see if it is necessary to align the GOPs across multiple encoded streams. If not, operations continue to block 320. However, if GOP alignment is required, a check is made to see if the current frame is at the beginning of a GOP by comparing the quantity (Frame Count mod GOP size) to zero (block 319). If the Frame Count mod GOP size is zero, then the current frame is at the beginning of a Group of Pictures, and operations proceed to block 320. However, if the Frame Count mod GOP size is not zero (i.e., the constraint is not met), then the captured frame is ignored and the operations return to block 310 where a new frame is captured and the Frame Count is recalculated for the next captured frame. At block 320 encoding can start on the current frame.

The final step is to produce the Encode Frame Timestamp (block 330) that will be the same across all of the encoding systems for any given frame. This is computed from the current frame's frame count and here is produced in HNS units.

$$\text{Timestamp} = \text{Frame Count} * 10000 * \text{\# of Milliseconds Per-Frame}$$

As noted above, for Adaptive Streaming applications, it is desirable for the various streams generated from a single source to be in sync (coordinated) with one another such that a frame of one of the streams has the same timestamp as the same frame in one of the other streams.

Assuming multiple processing entities (i.e., encoders and/or encapsulators) are producing a set of these discrete streams, independent of when the processing entities begin processing, it is desirable that they produce the exact same timing output at various levels of the video signal (e.g., frame, GOP, and/or segment). If the source time base is not linear (e.g. if it has discontinuities), or if the processing entities do not start within the same 24-hour calendar day, it may be difficult or impossible to ensure that the processing entities are producing the same timing output.

Certain embodiments of the present disclosure described herein address these issues by allowing two or more live encoding systems to start asynchronously from each other while maintaining a frame-accurate, time-based association of output frames from one encoding system to another. Being able to start asynchronously may permit restart and recovery after a system failure, and/or may permit a system to begin processing a video stream even after a discontinuity in the timestamps used for the streams: regardless of whether such discontinuity is a result of a new "day" starting, or because of a discontinuity in the timestamp of the source video signal.

In particular, certain embodiments of the present disclosure as described herein operate in a system including multiple processing entities (e.g., video encapsulators and/or encoders). When a first one of the processing entities begins to encode a source video signal, embodiments of the present disclosure define a time base that is communicated to the other processing entities when they start processing. Once processing has begun, the input-to-output time base follows a predictable pattern, which is monitored by one or more system elements. If the input time base changes, a prediction error will occur, and a new adjusted time base is produced and made known to the processing entities. Thus, when any processing entity starts, it may use the latest known input to output timing model. This enables processing entities to begin processing outside the calendar day in which the first processing entity began processing, and it also enables the later-starting processing entities to be in sync with earlier-starting processing entities, even if the source time base has changed since the earlier-starting processing entities began processing the source video stream.

Figure 15A:
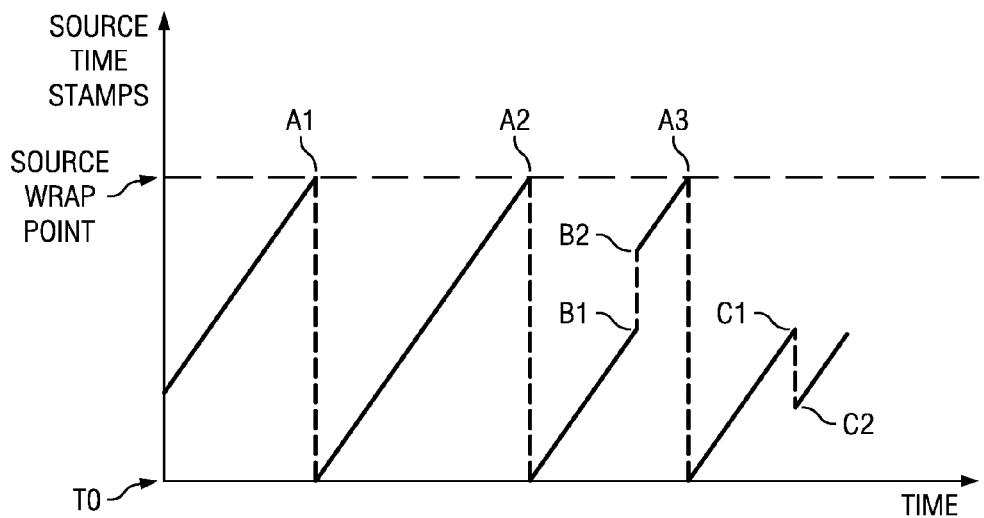
FIGS. 15A, 15B, and 15C are simplified graphs illustrating a progression of timestamps in source and destination video files.
Figure 15B:
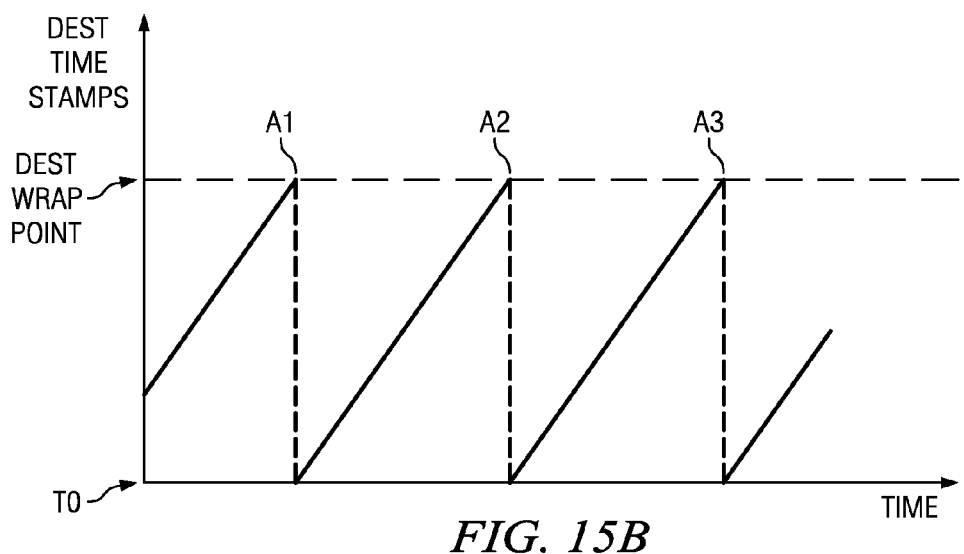
Figure 15C:
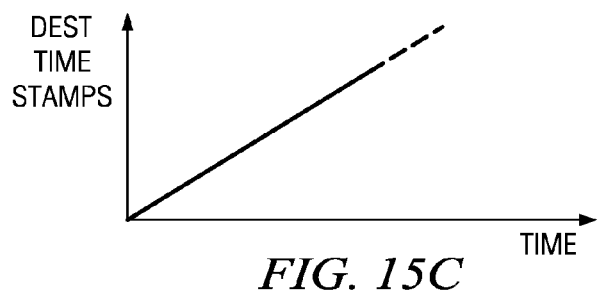

FIGS. 15A, 15B, and 15C are simplified graphs illustrating a progression of timestamps in source and destination video files. More specifically, FIG. 15A illustrates a hypothetical progression of timestamps in the live source video stream, and that further illustrates two types of discontinuities that may be encountered in live video stream timestamps. The timestamps shown in FIG. 15A start at an arbitrary time T0 at which point the timestamp of the live source video stream is nonzero. The source timestamps can increase linearly with time up to a point A1 at which the source timestamps reset back to zero (i.e., the source wrap point). The source timestamps can then increase linearly from zero up to the next source wrap point A2, at which point they reset to zero again.

As the source timestamps increase, a first discontinuity point B1 is reached, at which time the source timestamps jump to a new timestamp at point B2, which is higher than would otherwise be expected (assuming that timestamps are assigned in linear increments). A discontinuity can occur, for example, because of a previous edit in the source video stream, an error in the original source video stream, or for some other reason. From point B2, the source timestamps increase linearly to the next source wrap point A3. As the source timestamps increase further, a first discontinuity point C1 is reached, at which time the source timestamps jump to a new timestamp at point C2 that is lower than would otherwise be expected assuming that timestamps are assigned in linear increments. From point C2, the source timestamps increase linearly.

Referring to FIG. 15B and FIG. 15C, these graphs illustrate a destination (output) timestamps of systems according to certain embodiments of the present disclosure. It may be desirable for the destination timestamps to increase linearly with time without discontinuities. In the systems illustrated in FIG. 15B, the destination timestamps wrap at destination wrap points A1, A2, A3, etc., while in the systems illustrated in FIG. 15C, the destination timestamps do not wrap, but continue to increase linearly with time.

Figure 16:
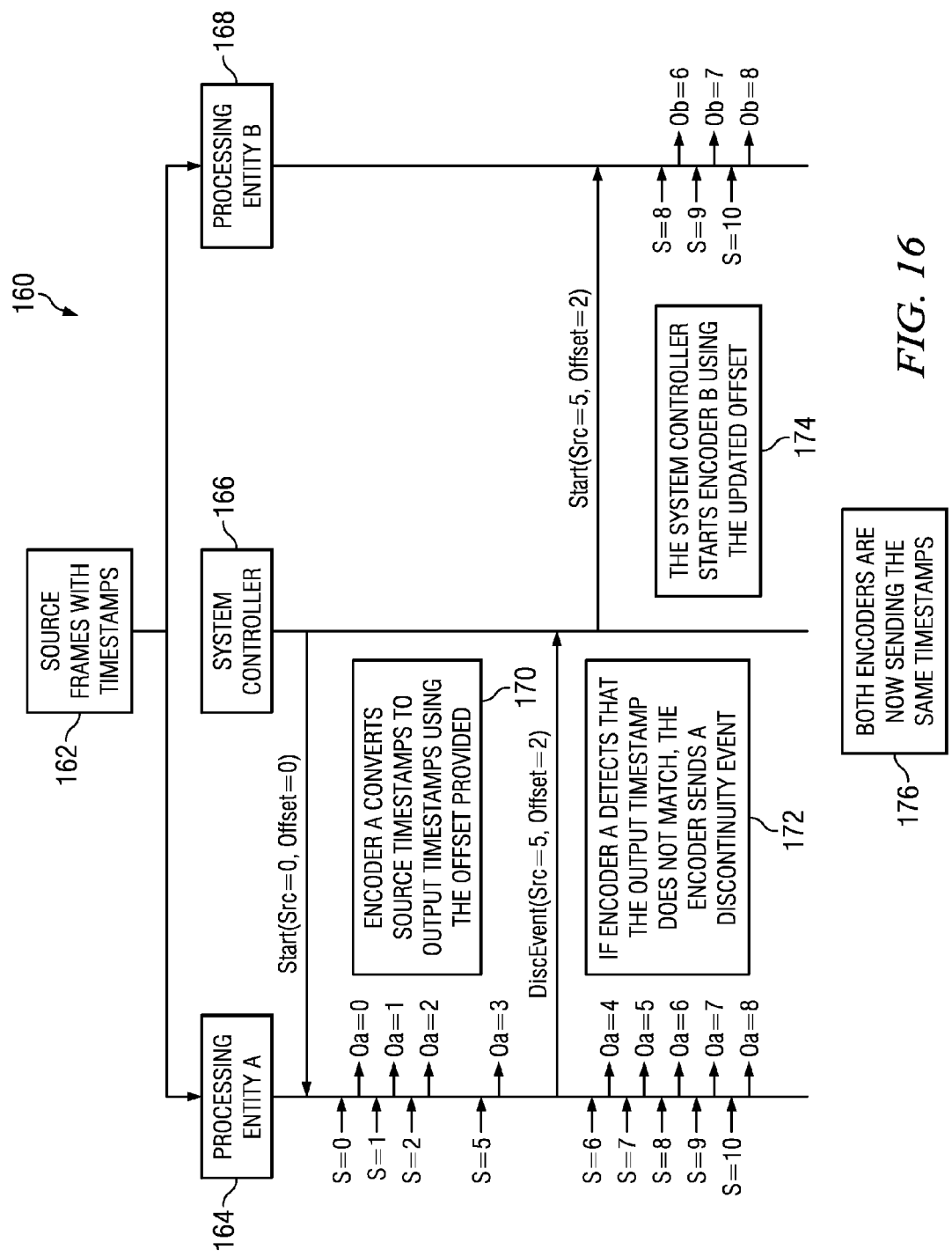
FIG. 16 is a simplified flowchart that illustrates a generation of sequential output timestamps by multiple processing entities according to certain embodiments of the present disclosure.

FIG. 16 is a simplified flowchart 160 that illustrates a generation of sequential output timestamps by multiple processing entities according to certain embodiments of the present disclosure. Also depicted are source frames with timestamps 162, which can be fed to any suitable location. The architecture may include a plurality of processing entities such as Processing Entity A 164 and Processing Entity B 168, which are configured to receive and process a stream of video frames, such as a stream of live source video frames. In this particular context, "live source video frames" refers to video frames that are received by the processing entities as video frames from an external source, including pre-recorded and/or pre-processed video signals. The Processing Entities may be, for example, video encoders and/or video encapsulators, or any other suitable element.

Also provided in FIG. 16 is a system controller 166, which is configured for communicating with the Processing Entities to coordinate the assignment of timestamps by the Processing Entities. In certain embodiments of the present disclosure, system controller 166 may not receive a source video stream. In other embodiments, system controller 166 may itself comprise a Processing Entity.

In certain embodiments of the present disclosure, system controller 166 may instruct one or more of the Processing Entities to begin processing the source video stream. In particular, system controller 166 may issue a Start command to Processing Entity A that instructs the Processing Entity to begin processing frames at a source frame having a specified frame timestamp. The command can also include a directive to assign timestamps to the processed output frames using a defined offset between the timestamp of the input frame and the assigned timestamp of the output frame. Thus, in the example illustrated in FIG. 16, system controller 166 issues a Start(Src=0, Offset=0) command to Processing Entity A, instructing Processing Entity A to begin processing source frames beginning at the source frame having a timestamp of 0, and generating destination (output) frames having timestamps that are offset from the source frame by an Offset of 0. Some of these activities are indicated generally at 170.

As Processing Entity A processes frames it assigns timestamps to the destination frames that are the same as the timestamps of the source frames (S=0, Oa=0; S=1, Oa=1; etc., where "S" refers to the timestamp in the source and "Oa" refers to the timestamp output by Processing Entity A, etc.). However, at the fourth frame, when a source timestamp of S=3 was expected, Processing Entity A instead received a frame having a source timestamp of 5. As this timestamp is discontinuous relative to earlier timestamps, Processing Entity A issues a discontinuity reporting command DiscEvent (Src=5, Offset=−2) to system controller 166, indicating that a discontinuity event occurred in the source video stream at the frame having the timestamp of 5, indicating an offset between the actual frame timestamp and the expected frame timestamp of −2, which is generally depicted at 172.

At a future point in time, system controller 166 instructs another processing entity, namely Processing Entity B, to begin processing video frames from the live video stream. Thus, system controller 166 issues a Start(Src=5, Offset=−2) command to the Processing Entity B, instructing Processing Entity B to begin processing frames of the live video stream. The parameters of the Start( ) command issued to Processing Entity B indicate that, when generating destination frames, a Offset of −2 should be applied to source frames having a source timestamp of 5 or more, which is generally depicted at 174. At this point, both processing entities will be assigning the same timestamps to equivalent destination frames, which is generally depicted as 176.

In a particular embodiment, processing entities A and B are encoding elements, where system controller 166 can be provisioned in any suitable device or network location. System controller 166 may be configured to provide the start time and source characteristic. In this example, those are both set to zero (i.e., there is no offset required at this juncture).

Note that in terms of the infrastructure of the present disclosure, any number of networks can be used to deliver a video stream to an encoding system. The term 'video stream', as used herein, includes any type of packet exchange, which may be related to any type of video, audio-visual, voice, media, script data, or any type of source or object code, or any other suitable information in any appropriate format that may be communicated from one point to another in the network. This can include routine network communications, unicast communications, point-to-point communications, multicast communications, any type of streaming content, or any other suitable network communication in which an error may be discovered. Moreover, the network infrastructure can offer a communicative interface between content sources, endpoint devices, and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. Such networks may implement a UDP/IP connection and use a TCP/IP communication language protocol in particular embodiments of the present disclosure. Further, such networks may implement any other suitable communication protocol for transmitting and receiving data packets within the architecture. Data, as used herein in this document, refers to any type of numeric, voice, video, media, or script data, or any type of source or object code, or any other suitable information in any appropriate format that may be communicated from one point to another.

Figure 17:
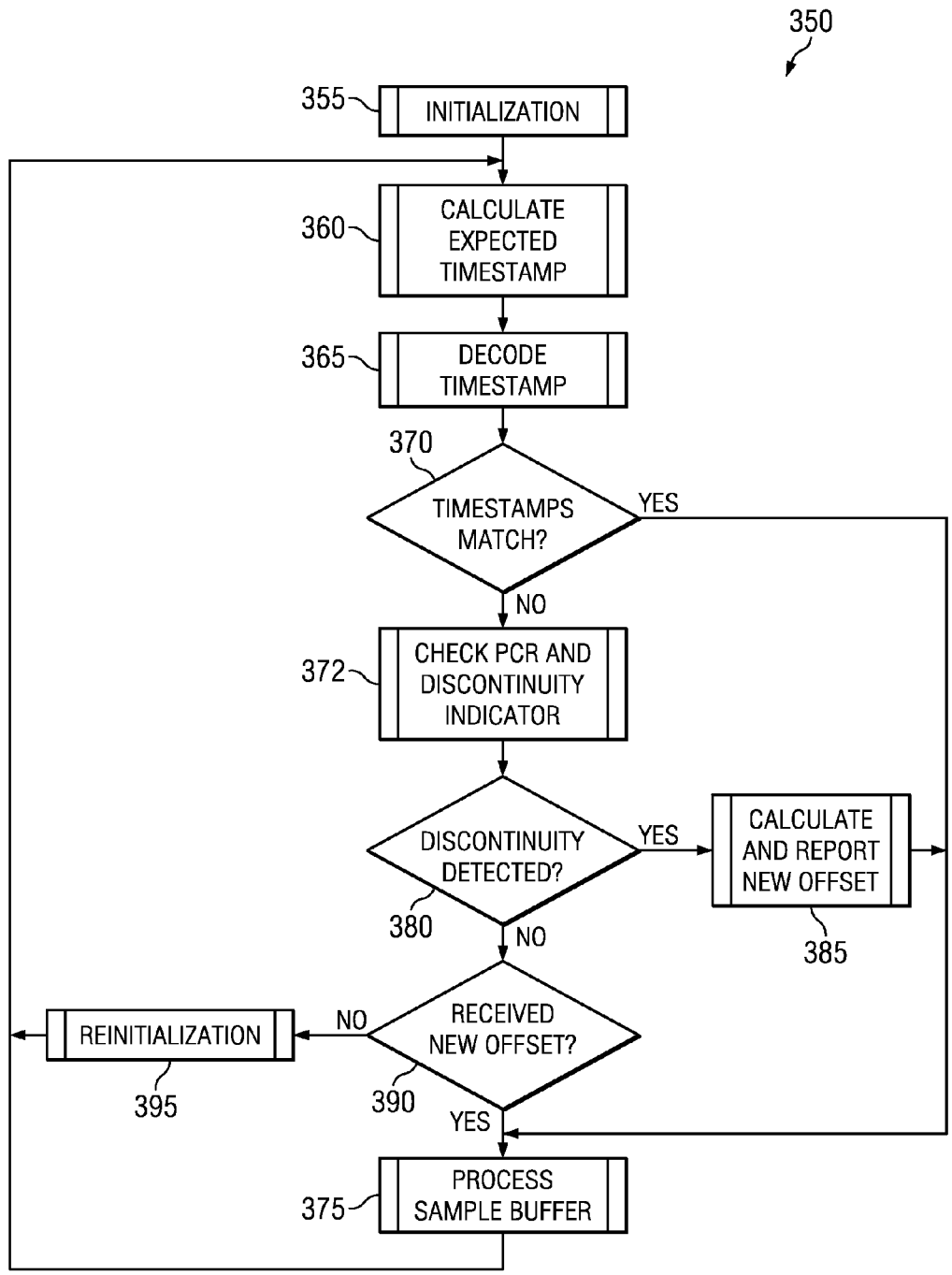
FIG. 17 is a simplified flowchart that illustrates a protocol for generating timestamps across multiple processing entities according to certain embodiments of the present disclosure.

FIG. 17 is a simplified flowchart 350 that illustrates a protocol for generating timestamps across multiple processing entities according to certain embodiments of the present disclosure. More specifically, FIG. 17 illustrates operations of a Processing Entity (PE) according to certain embodiments of the present disclosure. As illustrated therein, after an initialization step (355) described in more detail below with respect to FIG. 19, the PE may calculate an expected timestamp (block 360) taking into account the source timestamp of a previous source frame and an applied offset, if any. The PE may then decode the timestamp (block 365) and determine if the decoded timestamp matches the expected timestamp (block 370). If the timestamps match, operations proceed to block 375, where the PE processes the sample buffer, after which operations return to block 370 to calculate the next expected timestamp.

If the timestamps do not match, the PE is configured to check the continuity of the program clock reference (PCR) to determine if the mismatch is due to packet loss/delay. A check may also be provided to see if the mismatch is due to a discontinuity (block 372). If a discontinuity is detected (block 380), the PE calculates and reports a new offset to the system controller (block 385), and then processes the sample buffer (block 375). If no discontinuity is detected, the PE then checks to see if a new offset has been received (i.e., an offset with a timestamp greater than or equal to the last timestamp received before packet loss) (block 390). If so, the PE proceeds to process the sample buffer (block 375). If no new offset has been received, the PE performs a re-initialization procedure as discussed below with reference to FIG. 20 (block 395) before returning to block 360 to calculate the next expected timestamp.

Figure 18:
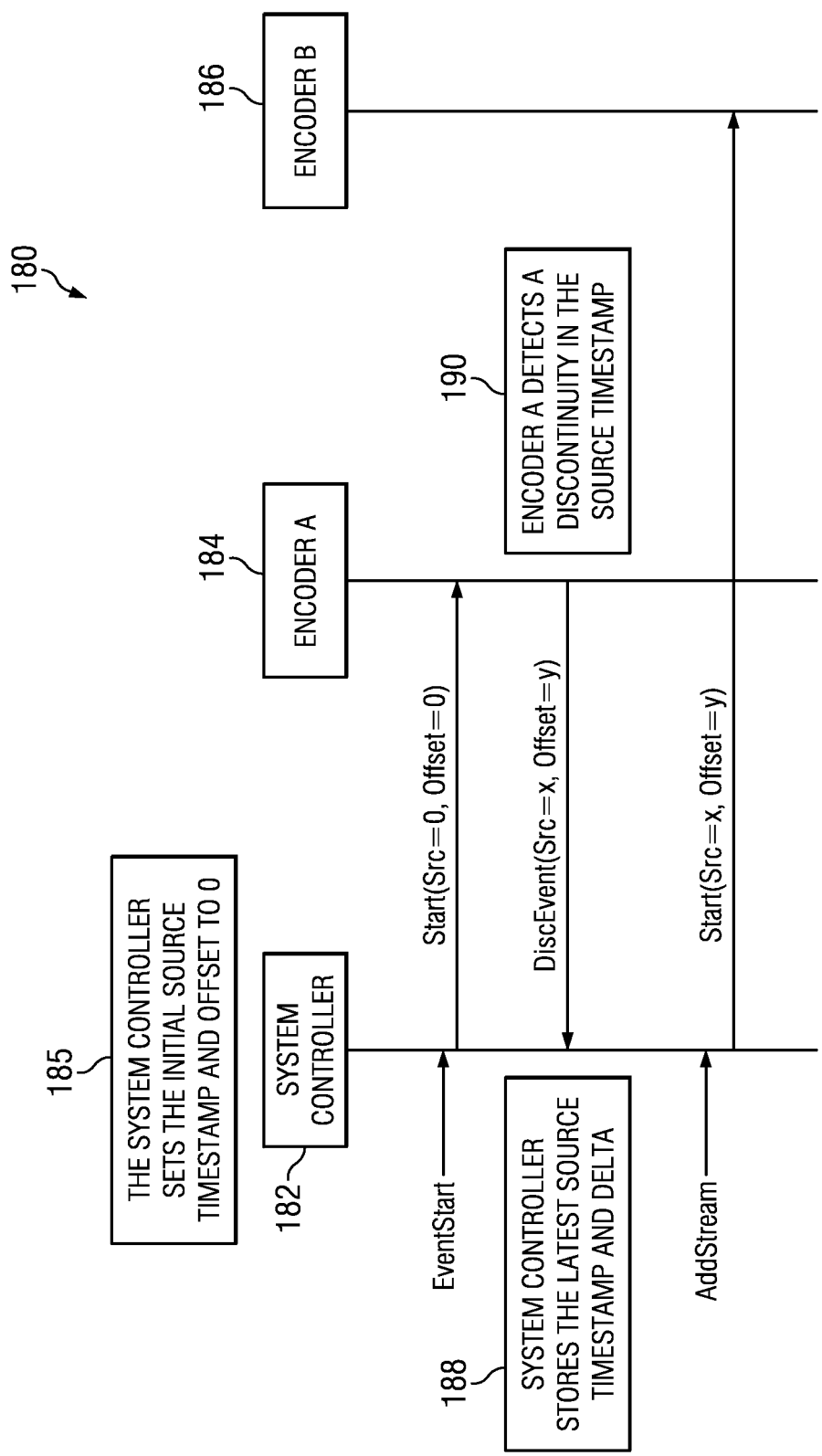
FIG. 18 is a simplified flowchart illustrating a generation of sequential output timestamps by multiple processing entities from the standpoint of a system controller according to certain embodiments of the present disclosure.

FIG. 18 is a simplified flowchart 180 illustrating a generation of sequential output timestamps by multiple processing entities from the standpoint of a system controller 182 according to certain embodiments of the present disclosure. This particular flow may include an encoder A 184, along with an encoder B 186. As illustrated in FIG. 18, the system controller may receive an EventStart command from a remote host. In response, the system controller may send a Start( ) command to one of a plurality of processing entities.

System controller 182 can set the initial source timestamp an offset to 0 (shown generally at 185). When the processing entity encounters a discontinuity in the source video timestamps, it may send a discontinuity reporting command DiscEvent( ) indicating the timestamp of the source frame at which the discontinuity occurred and the associated delta. This is indicated generally at 190. System controller 182 may then receive an AddStream command from the remote host instructing it to add a processing stream. In response, system controller 182 may send a Start( ) command to a second processing entity specifying the timestamp of the source frame at which the discontinuity occurred and the associated delta. Hence, system controller 182 may store the latest source timestamp delta, shown generally at 188.

Figure 19:
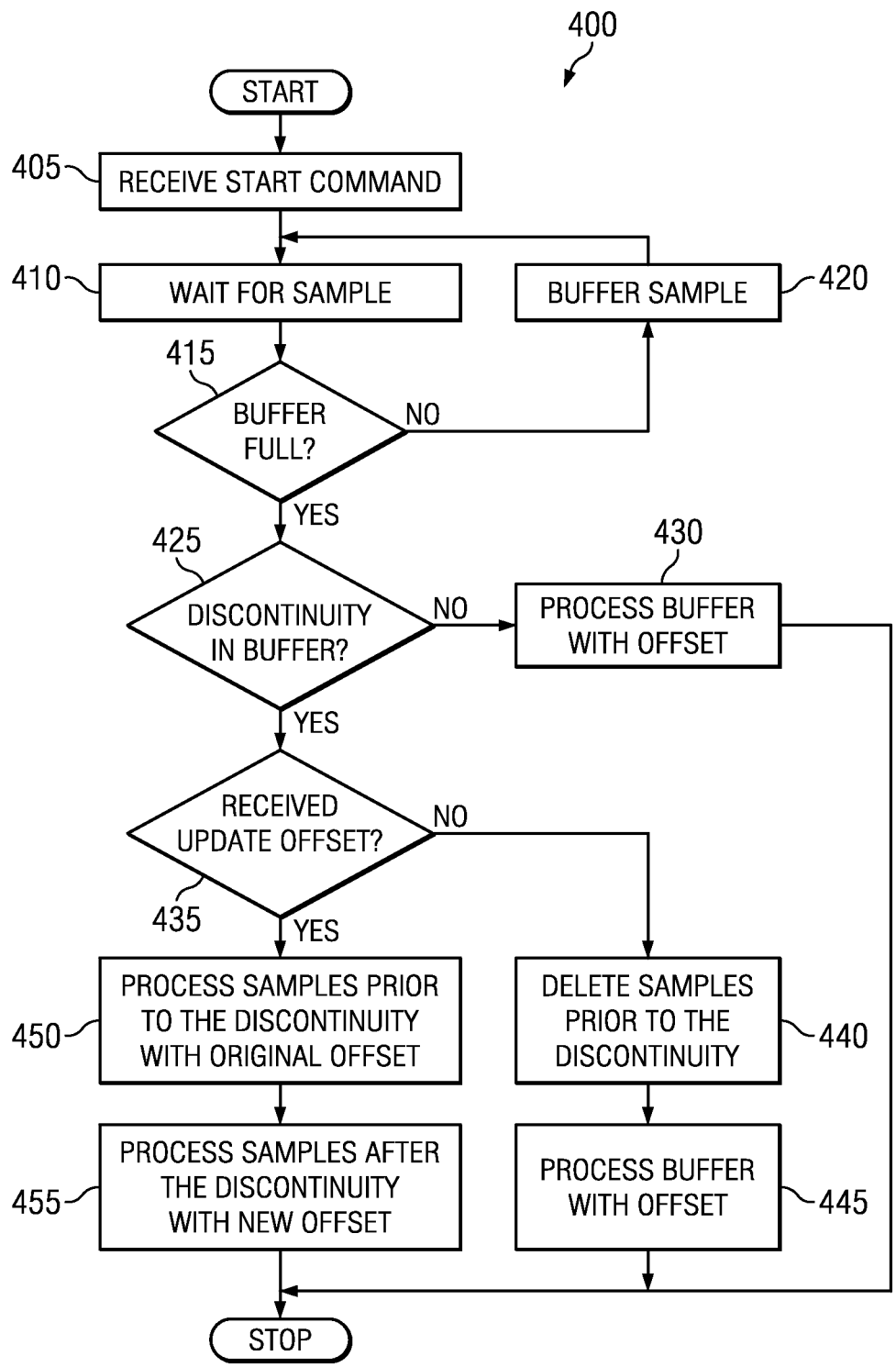
FIG. 19 is a simplified flowchart illustrating initialization operations of a Processing Entity (PE) according to certain embodiments of the present disclosure.

FIG. 19 is a simplified flowchart 400 illustrating initialization operations of a PE according to certain embodiments of the present disclosure. As noted above, the initialization process may be performed at block 355, as illustrated in FIG. 17. After receiving a Start( ) command (block 405), the PE waits for an incoming sample from the video stream (block 410). Once a sample has been received, the PE checks to see if its processing buffer is full (block 415). If the buffer is not full, the sample is buffered (block 420) and a new sample is awaited.

Once the buffer has filled up, the PE begins processing the buffered samples in accordance with the offset parameter specified in the Start( ) command. In particular, the PE examines the buffer to determine if a discontinuity is present in the buffered samples (block 425). If no discontinuity is detected, the buffer is processed using the offset specified in the Start( ) command (block 430). If a discontinuity is detected in the buffered samples, the PE checks to see if an updated offset has been received (block 435). If no updated offset has been received, the samples in the buffer that are prior to the discontinuity may be discarded (block 440) and the remaining samples in the buffer may be processed using the specified offset (block 445). If it is determined in block 435 that an updated offset was received by the PE, the PE may optionally process samples up to the discontinuity point using the original offset (block 450) and then process samples after the discontinuity point using the new offset (block 455).

Figure 20:
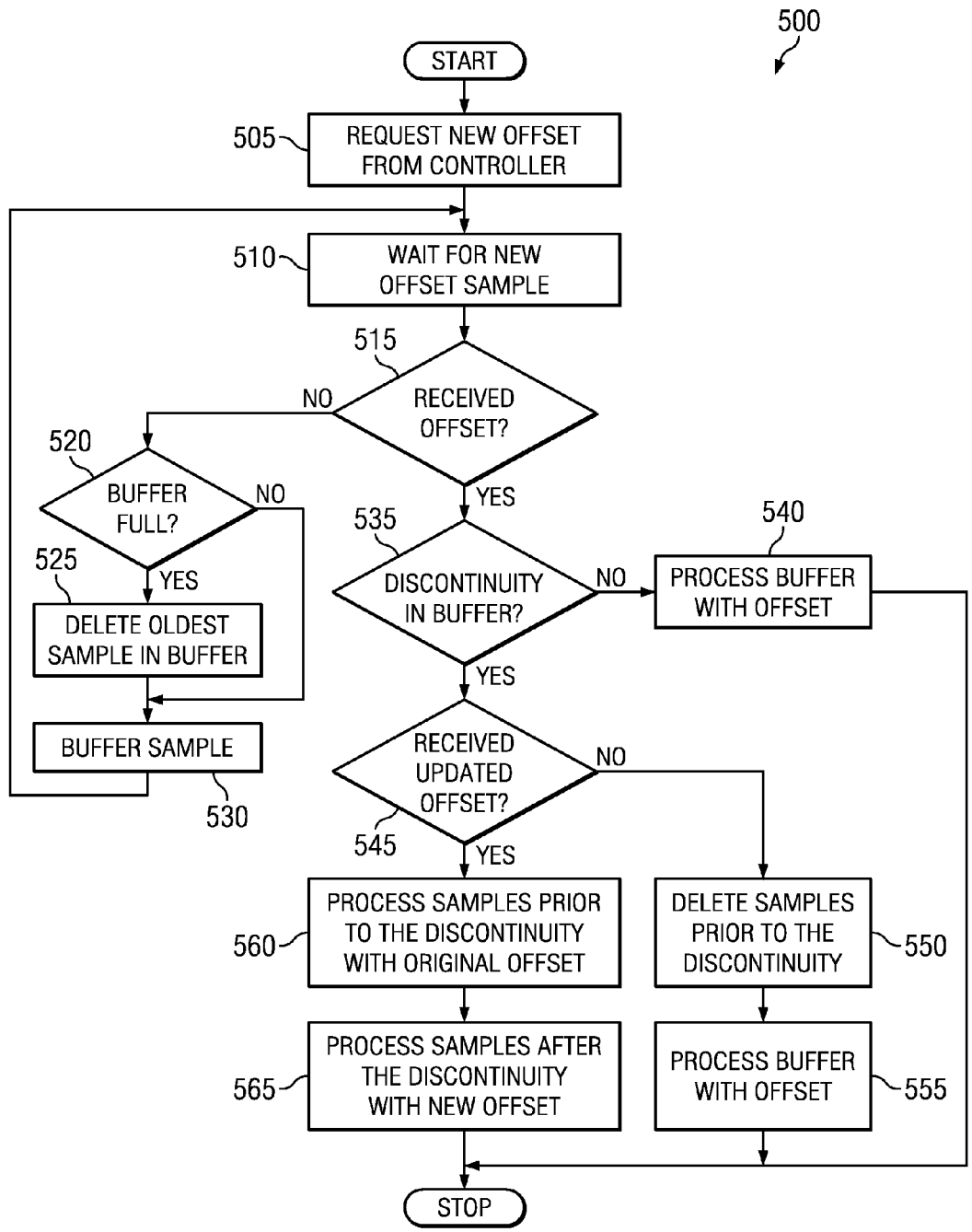
FIG. 20 is a simplified flowchart illustrating re-initialization operations of a Processing Entity (PE) according to certain embodiments of the present disclosure.

FIG. 20 is a simplified flowchart 500 illustrating re-initialization operations of a PE according to certain embodiments of the present disclosure. As noted above, the re-initialization process may be performed at block 295 of FIG. 17. As is being illustrated, the PE can request a new offset from the system controller (block 505). The PE then waits to receive a new offset or a new sample (block 510). When an input (i.e., a sample or offset) has been received, the PE can determine whether the input is a sample or a new offset (block 515). If the input is a sample, the PE checks to see if its processing buffer is full (block 520). If the buffer is not full, the new sample is buffered (block 530), and the PE again waits for the next input (block 505). If the buffer is full, the PE deletes the oldest sample in the buffer (block 525), buffers the received sample (block 530), and again waits for the next input (block 505). If the input is determined at block 415 to be a new offset, operations proceed to block 525. In addition, blocks 525-555 are the same as the corresponding blocks illustrated in FIG. 19.

Figure 21:
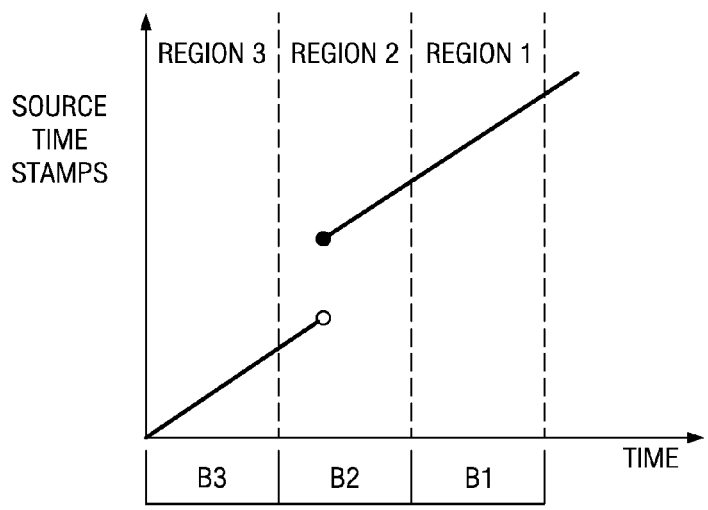
FIG. 21 is a simplified graph illustrating source timestamps as a function of time according to certain embodiments of the present disclosure.

FIG. 21 is a simplified graph illustrating source timestamps as a function of time according to certain embodiments of the present disclosure. The source timestamps increase linearly up to a discontinuity point, and then increase linearly again after the discontinuity point. FIG. 21 illustrates three possible regions of operation of a PE based on the size of the processing buffer of the PE and the location of the discontinuity relative to samples buffered in the processing buffer. For example, in Region 1 illustrated in FIG. 21, the PE has buffered samples in a buffer B1 that include samples occurring after the discontinuity point has occurred in the source timestamps. Stated in different terms, the samples buffered in the buffer B1 in Region 1 of operation were generated by the source after the discontinuity point. In Region 2, the PE has buffered samples in a buffer B2. The discontinuity point is captured in the buffer B2.

Figure 29:
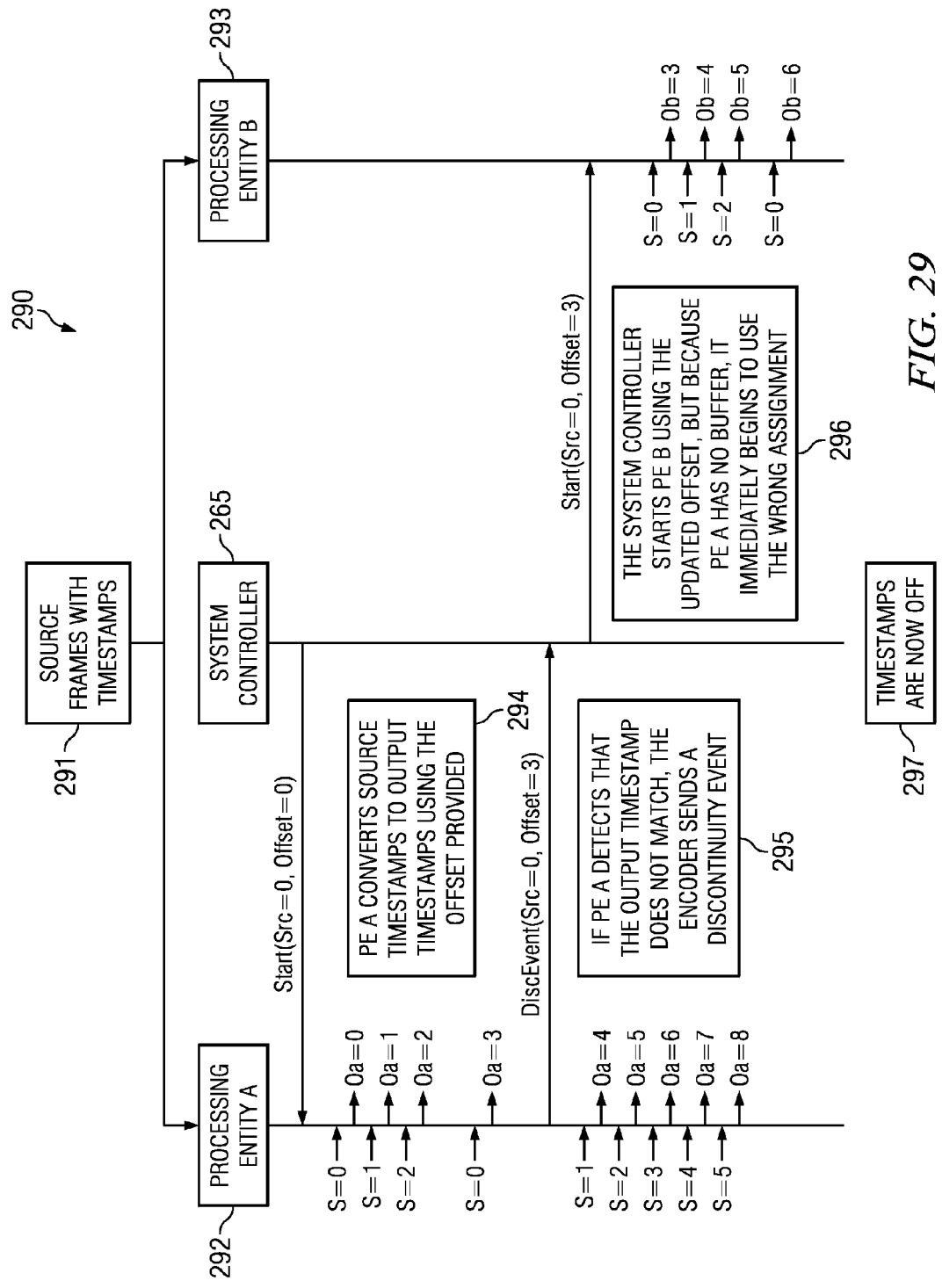
FIG. 29 is a simplified flowchart illustrating operations of a system involving a processing buffer.

In Region 3, the PE has buffered samples in a buffer B3 that include samples occurring before the discontinuity point has occurred in the source timestamps. The samples buffered in the buffer B1 in Region 1 of operation were generated by the source before the discontinuity point occurred. The operation in Region 3 due to too small of a processing buffer may be problematic, because, for example, there may be ambiguity if a discontinuity occurs that lowers the source timestamp. That particular situation is illustrated in FIG. 29, and discussed in more detail below.

Figure 22:
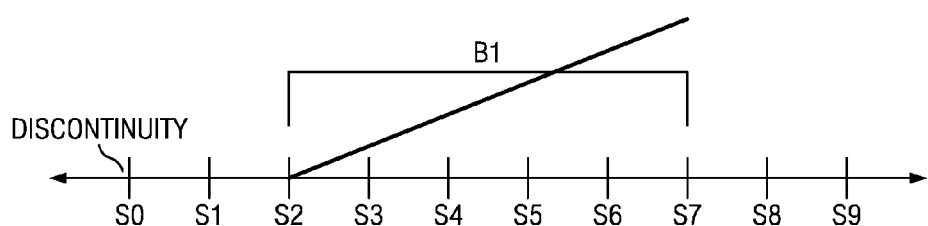
FIG. 22 is a simplified schematic illustrating an example assignment of input timestamps processed by a PE operating in a Region 1 according to certain embodiments of the present disclosure.
Figure 23:
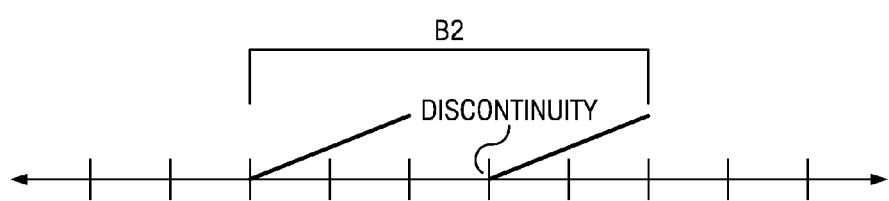
FIG. 23 is a simplified schematic illustrating an example assignment of input timestamps processed by a PE operating in a Region 2 according to certain embodiments of the present disclosure.

FIG. 22 is a simplified schematic illustrating an example assignment of input timestamps processed by a PE operating in a Region 1 according to certain embodiments of the present disclosure. As illustrated in FIG. 22, the PE begins processing samples from the beginning of the buffer and assigns timestamps based on the offset received from the system controller. FIG. 23 is a simplified schematic illustrating an example assignment of input timestamps processed by a PE operating in a Region 2 according to certain embodiments of the present disclosure. As described above with respect to FIG. 19, the PE is configured to check to see if an updated offset has been received, and if not, the PE discards samples prior to the discontinuity. Otherwise, the PE assigns timestamps to samples before the discontinuity based on the original offset received from the system controller, and the PE assigns timestamps to samples after the discontinuity based on the updated offset.

Figure 24:
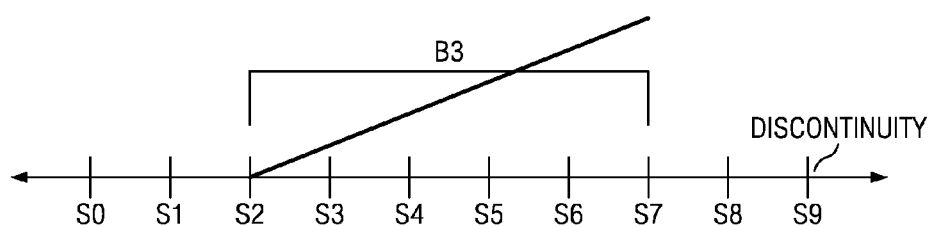
FIG. 24 is a simplified schematic illustrating an example assignment of input timestamps processed by a PE operating in a Region 3 according to certain embodiments of the present disclosure.

FIG. 24 is a simplified schematic illustrating an example assignment of input timestamps processed by a PE operating in a Region 3 according to certain embodiments of the present disclosure. FIG. 24 more specifically reflects discontinuity occurring after the buffered samples. As shown therein, the PE begins processing samples from the beginning of the buffer and then assigns timestamps to samples in the buffer without applying an offset.

Figure 25:
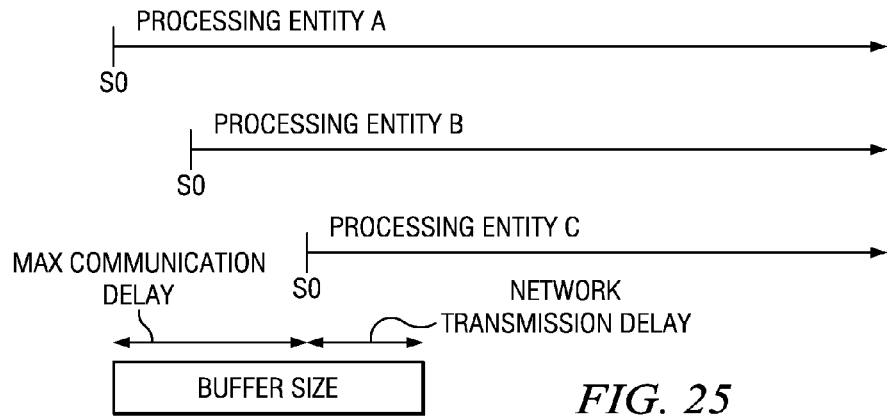
FIG. 25 is a simplified schematic illustrating a communication delay between multiple processing entities.

FIG. 25 is a simplified schematic illustrating a communication delay between multiple processing entities. This particular scenario involves several processing entities (A-C). In order to ensure that samples including discontinuities are buffered for a sufficient time, it is desirable to appropriately size the processing buffer of a PE. The buffer should be large enough to hold a number of samples equal to the largest possible communication delay that may be encountered between the time a discontinuity event is experienced by one PE to the time it is reported by the system controller to another PE (including the delay for communication through the system controller and the network transmission delay between the entities). Thus, as illustrated in FIG. 25, the maximum communication delay may correspond to the difference in absolute time between the time sample S0 is received by the earliest PE (Processing Entity A of FIG. 25) to the time the same sample is received by the latest PE (Processing Entity C of FIG. 25).

If the buffer size were large enough, it can be assumed that a given PE is generally operating in Region 1 or Region 2 (illustrated in FIG. 21). Hence, if the buffer size is large enough, it can be assumed that any discontinuity event is in the buffer before a notification of the discontinuity event reaches the PE. Examples of operation in Region 1 and Region 2 are shown in FIGS. 26-28 and discussed below.

Figure 26:
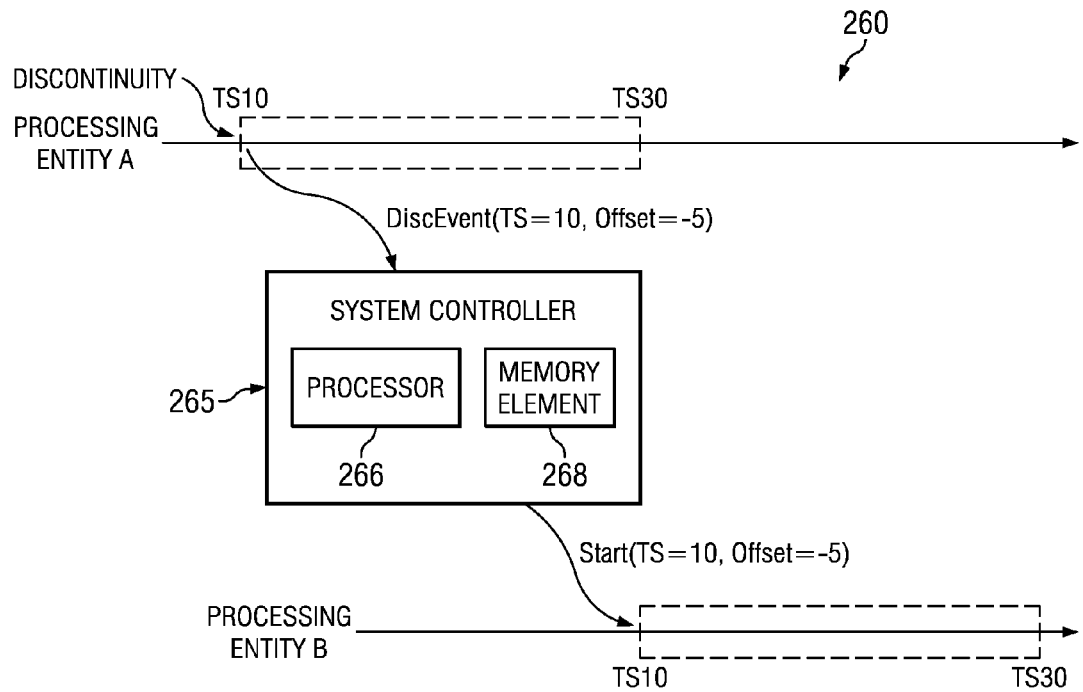
FIGS. 26, 27, and 28 are simplified schematic diagrams that illustrate various operations of a system including two processing entities and a system controller.
Figure 27:
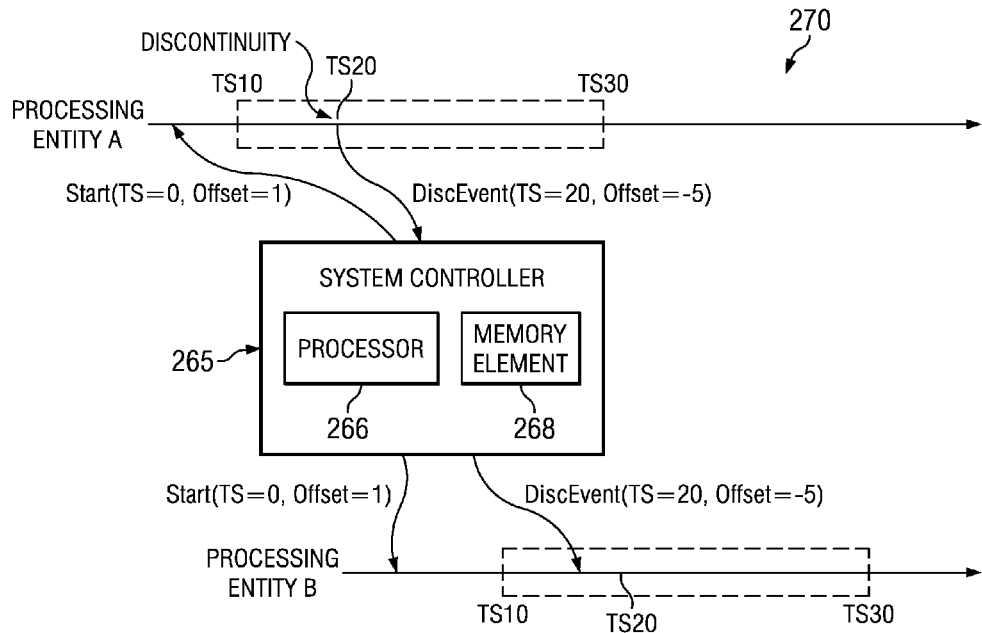
Figure 28:
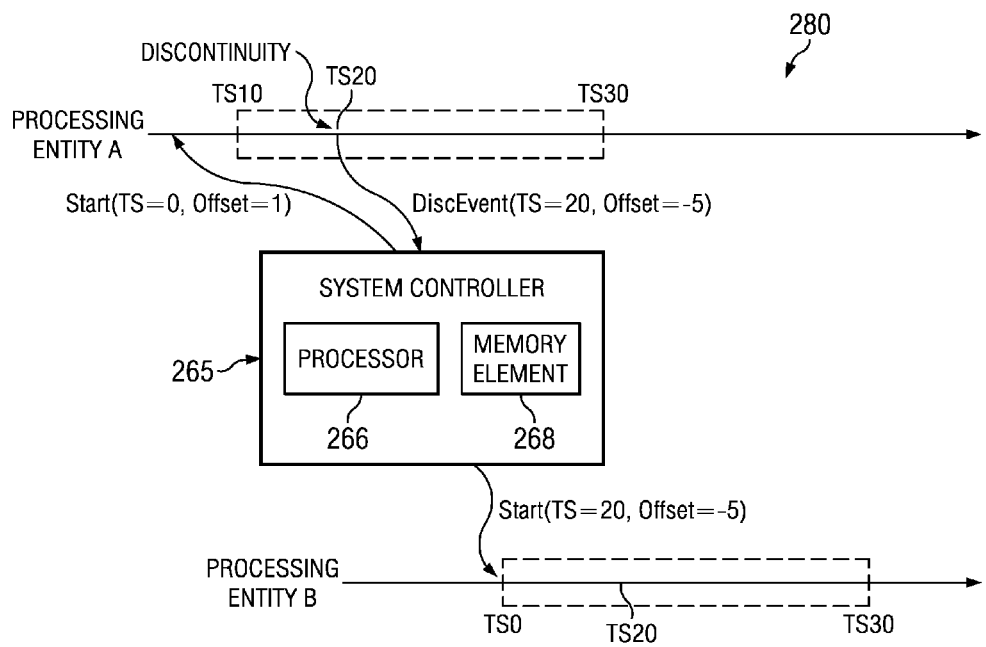

FIGS. 26, 27, and 28 are simplified schematic diagrams that illustrate various operations of a system including two processing entities and a system controller 265, which may include a processor 266 and a memory element 268. Referring to FIG. 26, a system including Processing Entity A and Processing Entity B are illustrated generally at 260. In this example, PE A discovers the discontinuity and PE B is operating in Region 1 (i.e., the discontinuity has occurred before PE B begins buffering). In this particular example, PE A encounters a discontinuity at timestamp TS10 of an input video stream, and then notifies the system controller via a DiscEvent( ) message. System controller 265 issues a start command instructing PE B to begin processing the video stream, and also specifies that an offset of −5 is to be applied to all samples having a timestamp of TS10 or greater.

FIG. 27 illustrates a Region 2 operation according to certain embodiments of the present disclosure (generally indicated at 270). More specifically, system controller 265 instructs both PE A and PE B to begin processing the input video signal with an offset of 1 for timestamps of 0 or more. Before PE B begins processing (due to communication delays, for example), PE A discovers a discontinuity and issues a DiscEvent( ) notification to the system controller, specifying TS20 and an offset of −5. Consequently, system controller 265 issues a DiscEvent( ) notification to PE B. As the buffer of PE B fills up in response to the Start( ) command, PE B can detect the discontinuity in the buffer and apply the appropriate offset.

The Region 2 operation in other situations (shown generally at 280) is illustrated in FIG. 28. As shown in FIG. 28, system controller to 65 instructs PE A to begin processing the input video signal with an offset of 1 for timestamps of 0 or more. Before PE B has been instructed to start processing, PE A discovers a discontinuity and issues a DiscEvent( ) notification to system controller 265, specifying TS20 and an offset of −5. System controller 265 then issues a Start( ) command, also specifying TS20 and an offset of −5. PE B can then examine the samples in its buffer and check to see if an updated offset was received. Assuming no updated offset was received, PE B may assume that the discontinuity in the buffer is the one referenced in the Start( ) command. All packets before the discontinuity may be discarded by PE B, and PE B may process the remaining samples using the specified offset.

FIG. 29 is a simplified flowchart 290 illustrating operations of a system involving a processing buffer. This particular architecture includes a PE A 292, a PE B 293, system controller 265, and source frames with timestamps 291. More specifically, FIG. 29 illustrates a situation that can occur if the processing buffer of a PE is too small and the PE is operating in Region 3. For purposes of illustration, in this particular example, PE B has no input buffer (i.e., samples are processed as they are received). PE A is configured to convert source timestamps to output timestamps using the offset provided, which is generally indicated at 294.

In the example, PE A receives samples having timestamps of S=0, 1, 2, etc. PE A is configured to detect a discontinuity with an offset of +3 at a second sample having a timestamp S=0 (i.e. the timestamps in the source were reset). PE A notifies the system controller of the discontinuity via a DiscEvent( ) message. Hence, if PE A detects that the output timestamp does not match, the encoder is configured to send out a discontinuity event, which is generally indicated at 295.

Thereafter, the system controller issues a Start( ) command to PE B specifying that an offset of 3 should be applied to samples having a source timestamp of S=0 or greater. However, because PE B is delayed in receiving the first sample of the input stream, it receives the sample having timestamp S=0 and, having no buffer, processes it immediately. PE B would therefore erroneously apply a timestamp of 3 to the processed sample. By sizing the processing buffer of PE B appropriately, PE B could detect the discontinuity and apply the offset at the appropriate sample. Hence, and as generally indicated at 296, system controller 265 is configured to start PE B using the updated offset; however, PE A has no buffer and, therefore, it immediately begins to use the wrong assignment. Timestamps are effectively off, which is being depicted generally at 297.

Note that in certain example implementations, the synchronization functions outlined herein may be implemented in logic encoded in one or more non-transitory media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIGS. 10, 26, 27, 28] can store data used for the operations described herein. This includes the memory element being able to store code (e.g., software, logic, processor instructions, etc.) that can be executed to carry out the activities described in this Specification. A processor can execute any type of instructions associated with the data to achieve the operations detailed herein in this Specification. In one example, the processor [as shown in FIGS. 10, 26, 27, 28] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Note that with the example provided above, as well as numerous other examples provided herein, interaction may be described in terms of two, three, or four devices, systems, subsystems, or elements. However, this has been done for purposes of clarity and example only. In certain cases, it may be easier to describe one or more of the functionalities of a given set of flows by only referencing a limited number of video elements. It should be appreciated that the architectures discussed herein (and their teachings) are readily scalable and can accommodate a large number of components, as well as more complicated/sophisticated arrangements and configurations. Accordingly, the examples provided should not limit the scope or inhibit the broad teachings of the architectures discussed herein as potentially applied to a myriad of other architectures.

It is also important to note that the steps in the preceding flow diagrams illustrate only some of the possible signaling scenarios and patterns that may be executed by, or within, the architectures discussed herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the architectures discussed herein in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain endpoint components and certain protocols, the architectures discussed herein may be applicable to other protocols and arrangements. Moreover, the present disclosure is equally applicable to various technologies, as these have only been offered for purposes of discussion. Along similar lines, the architectures discussed herein can be extended to any communications involving network elements, where the present disclosure is explicitly not confined to unicasting and multicasting activities.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   evaluating a first video stream encoded by a first encoding element, wherein the first video stream is provided at a first bit rate;
   evaluating a second video stream encoded by a second encoding element, wherein the second video stream is provided at a second bit rate;
   computing a frame count of an instant frame based on a time code and a capture time;
   beginning an encoding on the instant frame, in response to a determination that a mod n is zero, where a is the frame count of the instant frame, and n is a size of a Group of Pictures of at least one of the first video stream and the second video stream; and
   providing, based on the encoding of the instant frame, an output that is reflective of a time synchronization and a frame alignment for a plurality of frames within the first video stream and the second video stream.

2. The method of claim 1, wherein the frame alignment includes a group of pictures (GOP) alignment amongst the first video stream and the second video stream.

3. The method of claim 1, wherein the capture time is associated with a time that the first encoding element is initiated.

4. The method of claim 1, wherein the output is provided in conjunction with applying an adaptive bit rate protocol to synchronize timestamps associated with frames.

5. The method of claim 1, wherein the time code is inclusive of a date and a time of day associated with at least one of a plurality of incoming frames.

6. The method of claim 1, further comprising:
   storing an initial capture time to serve as a timestamp for subsequent encoding.

7. Logic encoded in non-transitory media that includes code for execution and, when executed by a processor, operable to perform operations comprising:
   evaluating a first video stream encoded by a first encoding element, wherein the first video stream is provided at a first bit rate;
   evaluating a second video stream encoded by a second encoding element, wherein the second video stream is provided at a second bit rate;
   computing a frame count of an instant frame based on a time code and a capture time;
   beginning an encoding on the instant frame, in response to a determination that a mod n is zero, where a is the frame count of the instant frame, and n is a size of a Group of Pictures of at least one of the first video stream and the second video stream; and
   providing, based on the encoding of the instant frame, an output that is reflective of a time synchronization and a frame alignment for a plurality of frames within the first video stream and the second video stream.

8. The logic of claim 7, wherein the frame alignment includes a group of pictures (GOP) alignment amongst the first video stream and the second video stream.

9. The logic of claim 7, wherein the capture time is associated with a time that the first encoding element is initiated.

10. The logic of claim 7, wherein the output is provided in conjunction with applying an adaptive bit rate protocol to synchronize timestamps associated with frames.

11. The logic of claim 7, wherein the time code is inclusive of a date and a time of day associated with at least one of a plurality of incoming frames.

12. The logic of claim 7, the operations further comprising:
    storing an initial capture time to serve as a timestamp for subsequent encoding.

13. An apparatus, comprising:
    a memory element;
    a processor operable to execute instructions associated with electronic code;
    a first encoding element configured to evaluate a first video stream, wherein the first video stream is provided at a first bit rate; and
    a second encoding element configured to evaluate a second video stream, wherein the second video stream is provided at a second bit rate, a frame count of an instant frame is computed based on a time code and a capture time, an encoding is begun on the instant frame, in response to a determination that a mod n is zero, where a is the frame count of the instant frame, and n is a size of a Group of Pictures of at least one of the first video stream and the second video stream, and an output is provided that is based on the encoding of the instant frame and is reflective of a time synchronization and a frame alignment for a plurality of frames within the first video stream and the second video stream.

14. The apparatus of claim 13, wherein the frame alignment includes a group of pictures (GOP) alignment amongst the first video stream and the second video stream.

15. The apparatus of claim 13, wherein the capture time is associated with a time that the first encoding element is initiated.

16. The apparatus of claim 13, wherein the output is provided in conjunction with applying an adaptive bit rate protocol to synchronize timestamps associated with frames.

17. The apparatus of claim 13, wherein the time code is inclusive of a date and a time of day associated with at least one of a plurality of incoming frames.

* * * * *